(12) United States Patent
Wang et al.

(10) Patent No.: US 6,598,717 B1
(45) Date of Patent: Jul. 29, 2003

(54) ACTIVE-PASSIVE HYBRID CONSTRAINED LAYER FOR STRUCTURAL DAMPING AUGMENTATION

(75) Inventors: Kon-Well Wang, State College, PA (US); Yanning Liu, San Jose, CA (US)

(73) Assignee: The Penn State Research Foundation, University Park, PA (US)

( * ) Notice: Subject to any disclaimer, the term of this patent is extended or adjusted under 35 U.S.C. 154(b) by 60 days.

(21) Appl. No.: 09/877,846

(22) Filed: Jun. 8, 2001

Related U.S. Application Data
(60) Provisional application No. 60/210,876, filed on Jun. 9, 2000.

(51) Int. Cl.[7] .............................. F16F 7/10; F16M 1/00
(52) U.S. Cl. ........................ 188/378; 267/136; 310/326
(58) Field of Search ................................. 310/326, 327; 188/378–380, 266.7; 267/136, 140.14, 140.15

(56) References Cited

U.S. PATENT DOCUMENTS

| | | | | |
|---|---|---|---|---|
| 4,565,940 A | * | 1/1986 | Hubbard, Jr. | ................ 310/326 |
| 4,626,730 A | * | 12/1986 | Hubbard, Jr. | ................ 310/326 |
| 4,833,659 A | * | 5/1989 | Geil et al. | ................... 310/326 |
| 5,458,222 A | * | 10/1995 | Pla et al. | ..................... 188/378 |
| 5,485,053 A | * | 1/1996 | Baz | ............................. 310/326 |
| 5,519,278 A | * | 5/1996 | Kahn et al. | ................. 310/326 |
| 5,838,092 A | * | 11/1998 | Wang et al. | ................ 310/326 |
| 6,116,389 A | * | 9/2000 | Allaei | ......................... 188/378 |
| 6,394,242 B1 | * | 5/2002 | Allaei | ......................... 188/378 |

* cited by examiner

*Primary Examiner*—Jack Lavinder
*Assistant Examiner*—Robert A. Siconolfi
(74) *Attorney, Agent, or Firm*—McKee, Voorhees & Sease, P.L.C.

(57) ABSTRACT

The invention is a method and apparatus for surface damping augmentation. The apparatus of the present invention includes a viscoelastic material, a hybrid constraining layer mechanically connected to the viscoelastic material and having an active material and a passive material, and the active material mechanically connected to the passive material. The method provides for selecting an active constraining material, selecting a passive constraining material, forming a hybrid constraining layer from the active constraining material and the passive constraining material, and mechanically connecting the hybrid constraining layer to a viscoelastic material.

17 Claims, 40 Drawing Sheets

ACTIVE-PASSIVE HYBRID CONSTRAINED LAYER FOR STRUCTURAL DAMPING AUGMENTATION

CROSS-REFERENCE TO RELATED APPLICATIONS

This application continuation of co-pending provisional application Ser. No. 60/210,876 filed Jun. 9, 2000, the disclosure of which is hereby specifically incorporated by reference.

GRANT REFERENCE

Work for this invention was funded in part by a grant from the United States Army Research Office, Army Research Office Grant No. DAAH04-96-1-0052.

BACKGROUND OF THE INVENTION

1. Field of the Invention

This invention relates generally to an apparatus and methods for reducing vibrations. More particularly, this invention relates to an active-passive hybrid constrained layer.

2. Background of the Invention

Controlling structural vibration is important in numerous technical fields. Examples of such fields include, without limitation, aerospace, automotive, machinery, and numerous other specific applications where vibration control is desirable. A background discussion of active controls and passive controls is found in U.S. Pat. No. 5,838,092, hereby incorporated by reference in its entirety.

Active constrained layer (ACL) damping treatments have been studied by various researchers. See Agnes, G. and Napolitano, K., 1993, "Active Constrained Layer Viscoelastic Damping," Proceedings 34$^{th}$ SDM Conference, pp. 3499–3506; Baz, A., 1993, "Active Constrained Layer Damping," Proceedings of Damping 93, San Francisco, Calif., Vol.3, pp. IBB 1–23; Shen, I. Y., 1993, "Intelligent Constrained Layer: An Innovative Approach," Intelligent Structures, Materials, and Vibrations, ASME DE-Vol. 58, pp. 75–82; Huang, S. C., Inman, D. J. and Austin, E. M., 1996, "Some Design Considerations for Active and Passive Constrained Layer Damping Treatments", Smart Materials and Structures, Vol. 5, pp. 301–313; Liao, W. H. and Wang, K. W., 1997, "On the Analysis of Viscoelastic Materials for Active Constrained Layer Damping Treatments," Journal of Sound and Vibration, Vol. 207, pp. 319–334; and Liao, W. H. and Wang, K. W., 1997, "On the Active-Passive Hybrid Control Actions of Active Constrained Layers," ASME Journal of Vibration and Acoustics, Vol. 119, pp. 563–572.

Such systems generally consist of a piece of viscoelastic material (VEM) sandwiched between an active piezoelectric layer and a host structure. The main purpose of using a piezoelectric coversheet is that its active action enhances the viscoelastic layer damping ability by increasing the VEM shear angle during operation (the so-called enhanced passive damping action). When the active action fails, significant passive damping could still exist in ACL (it becomes a passive constrained layer (PCL) configuration), which would be important for fail-safe reasons. On the other hand, because the VEM will reduce the active authority of the piezoelectric layer, it would be more effective to use the Enhanced Active Constrained Layer (EACL) concept disclosed in Liao, W. H. and Wang, K. W., 1996, "A New Active Constrained Layer Configuration with Enhanced Boundary Actions," Smart Materials and Structures, Vol. 5, pp. 638–648; Liao, W. H. and Wang, K. W., 1998, "Characteristics of Enhanced Active Constrained Layer Damping Treatments with Edge Elements, Part 2: System Analysis," ASME Journal of Vibration and Acoustics, Vol. 120, pp. 894–900; and Liu, Y., and Wang, K. W., 1999a, "A Nondimensional Parametric Study of Enhanced Active Constrained Layer Damping Treatments," Journal of Sound and Vibration, Vol. 223, No.4, pp. 611–644; or the separate active and passive designs of (Lam, M. J., Inman, D. J. and Saunders, W. R., 1998, "Variations of Hybrid Damping," Proceedings of SPIE on Smart Structures and Materials Vol. 3327, pp. 32–43, if high active action is needed. Therefore, it has been recognized that the applications best suitable for ACL treatments are those that can utilize significant damping from the VEM, rather than from direct piezoelectric-structure interactions.

Given the above observations, it would be important and desirable to optimize the open-loop characteristics (the so-called baseline structure without active action) of the ACL treatment, as well as the system's closed-loop behavior from the enhanced passive damping action. In both cases, the constraining layer material property plays an important role. An ideal constraining layer for ACL would be a material with high stiffniess, lightweight, and high active authority. So far, the constraining layer in ACLs has been limited to piezoelectric materials (e.g., PZT ceramics or PVDF polymer) because of their active features. PZT materials are in general much better than PVDF polymers for this purpose. Nevertheless, having a density similar to steel (relatively heavy) and a modulus close to aluminum (moderate stiffness), PZTs are not ideal as constraining materials (Lam, M. J., Inman, D. J. and Saunders, W. R., 1998, "Variations of Hybrid Damping," Proceedings of SPIE on Smart Structures and Materials Vol. 3327, pp. 32–43). Due to this limitation in the original baseline structure, the open-loop damping ability of an ACL system, in general, is less than that of an optimally designed PCL system.

As can be seen from the foregoing discussion, problems remain with active constraining layers. Thus a need in the art exists for a constraining layer that improves upon the prior art.

It is therefore an object of the present invention to provide a method and apparatus for a constrained layer damping treatment that improves over the state of the art.

A further object of the present invention to provide a method and apparatus for an improved constrained layer that optimizes the open-loop characteristics of an ACL treatment.

A further object of the present invention to provide a constrained layer that improves the systems closed-loop behavior from an active-passive damping action.

A further object of the present invention to provide a constrained layer that is capable of using piezoelectric materials.

A still further object of the invention is to provide a constrained layer capable of meeting damping requirements while requiring less added weight.

A still further object of the invention is to provide a constrained layer capable of use with different host structure strain distributions.

Other objects of the invention will become apparent from the description of the invention in that which follows.

BRIEF SUMMARY OF THE INVENTION

The invention is a novel method and apparatus for an active-passive hybrid constraining layer (HCL) surface damping treatment. The invention improves the damping performance of traditional active constrained layer systems. Instead of using a pure piezoelectric constraining layer or other active layer, passive and active materials are used together to constrain the viscoelastic material layer.

One aspect of the invention provides for selecting a passive constraining material and assigning appropriate lengths for the active and passive constraining parts in order to optimize the damping effect of the constraining layer.

Another aspect of the invention provides for separating the passive constraining material and/or the active constraining material into one or more sections in creating the constrained layer in order to improve the damping effect.

DETAILED DESCRIPTION OF THE INVENTION

Figure 1:
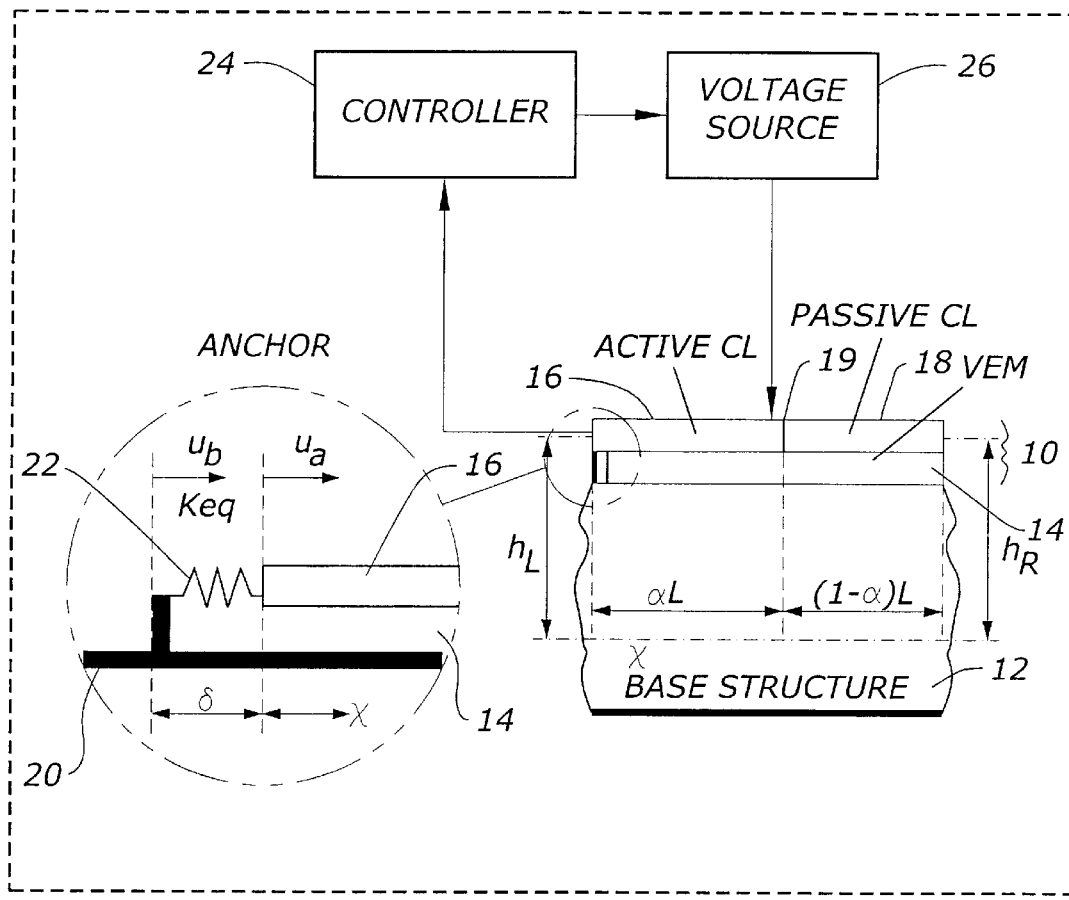
FIG. 1 is a diagram of a generic one-dimensional structure treated by HCL.

The present invention is a method and apparatus for an active-passive hybrid control layer for structural damping augmentation. To aid in describing the invention, the following nomenclature is used throughout:

b: Width of the host structure $D_b$: Bending stiffniess ratio between host structure and active constraining layer $D_p$: Bending stiffniess ratio between passive and active constraining layers $E_b$: Young's modulus of host structure $E_p$: Young's modulus of passive constraining material $E_a$: Young's modulus of active constraining material G: Non-dimensional control gain $G_v^*$: Complex shear modulus of VEM $G_{vj}$: Storage shear modulus of VEM $h_b$: Thickness of host structure $h_p$: Thickness of passive constraining material $h_a$: Thickness of active constraining material $h_v$: Thickness of VEM layer $h_L$: Distance between the neutral axis of host structure to the neutral axis of active constraining layer $h_R$: Distance between the neutral axis of host structure to the neutral axis of the passive constraining layer $K$: Non-dimensional anchor stiffness $K_{eq}$: Equivalent anchor stiffness $K_g$: Control gain $L$: Length of damping treatment Re[ ]: Real part of the complex number inside bracket $S_b$: Extensional stiffness ratio between host structure and active constraining layer $S_p$: Extensional stiffness ratio between passive and active constraining layers $u_b$: Longitudinal deformation at the neutral axis of the host structure $u_p$: Longitudinal deformation at the neutral axis of the passive constraining layer $u_a$: Longitudinal deformation at the neutral axis of the active constraining layer $\overline{U}_b$: Dimensionless displacement at the neutral axis of the host structure defined as $U_b/L$ $\overline{U}_p$: Dimensionless displacement at the neutral axis of the passive constraining material defined as $U_p/L$ $\overline{U}_a$: Dimensionless displacement at the neutral axis of the active constraining material defined as $U_a/L$ $w$: Transverse displacement of the system $\overline{W}$: Dimensionless transverse displacement of the system defined as $W/L$ $W_p$: Energy dissipated per cycle through VEM shear deformation $W_a$: Energy dissipated per cycle through direct action control action $W_s$: Maximum strain energy stored in system $\overline{x}$: Non-dimensional position coordinate defined as $x/L$ $\alpha$: Coverage ratio of the active constraining layer $\sigma_a, \sigma_p$: Longitudinal stress at the neutral axis of the active and passive constraining layer, respectively $\tau$: Shear stress in VEM $\rho_a, \rho_p$: Densities of active and passive constraining materials $\Lambda$: Strain of the active constraining material directly induced by the electric field $\gamma$: Shear strain in VEM layer $\eta_v$: VEM loss factor $\eta_p, \eta_a, \eta_s$: Passive, active and hybrid loss factors of the damping treatment $\eta_{op}$: Open-loop loss factor of damping treatment $\Gamma_a$: Dimensionless characteristic length of the treatment when $\alpha=1$ $\Gamma_p$: Dimensionless characteristic length of the treatment when $\alpha=0$ $\theta_a$: Dimensionless thickness of active constraining layer defined as $h_{a/L}$ $\theta_v$: Dimensionless VEM thickness defined as $h_v/L$ $\theta_L$: Dimensionless parameter defined as $h_L/L$ $\theta_R$: Dimensionless parameter defined as $h_R/L$ $\omega$: Vibration frequency of the system in radians $\Omega_p$: Non-dimensional characteristic frequency of the passive constraining part $\Omega_a$: Non-dimensional characteristic frequency of the active constraining part A hybrid constrained layer (HCL) damping treatment is described. In this novel configuration, the constraining layer consists of two different kinds of materials. One is an active material such as PZT, and the other is a passive material. By selecting a proper passive constraining material and adjusting the dimensions of the active and passive constraining layers, the baseline structure and the system's closed-loop performance are both improved. In other words, this new configuration not only uses the active characteristics of an active layer, but also improves the coversheet's ability to function as a constraining layer.

A dimensionless mathematical model of the HCL-based structure is described. Using a self-sensing control algorithm for the active component, the closed-form solutions to the equations of motion are obtained. The loss factors of the treatments are defined and used as indices to discuss the open-loop and closed-loop damping properties of the treatments. Experimental results are then shown to verify and validate the mathematical model of the invention. It should be appreciated by one skilled in the art, that the present invention is in no way limited to the particular example used to verify the created mathematical model, but this experimental setup and particular variables selected is merely one example or embodiment of the invention. The present invention includes other applications of the model discovered. As shown in FIG. 1, a generic one-dimensional base structure 12 is treated by HCL 11. That is, the VEM 14 is constrained by an active-passive hybrid constraining layer 11. The active part 16 is made of PZT ceramics. The active constraining part 16 and passive constraining part 18 are mechanically connected such that the displacement and force are continuous at the connecting point 19. However, they are isolated electrically so that the passive constraining layer 18 will not affect the function of the active constraining layer 16. This is not a concern if the passive material 18 is not conductive. The present invention contemplates that if the passive material is conductive then an insulative material may be placed between the active material and the passive material, the active material and the passive material are still mechanically connected, even though they are not in direct physical contact. At one end of the active layer 16, an anchor 20 is optionally used to F connect the active material 16 and the base structure 12. Results are verified and validated for both an HCL treatment with an anchor and an HCL treatment without the anchor. The following assumptions are made in deriving the model:

a) There is only shear deformation in VEM.

b) Passive damping is only generated by the shear deformation of VEM.

c) Interfaces are perfect; no slip occurs between the layers.

d) There is no relative transverse motion between different layers.

e) The displacement ($\delta$) between the anchor location on the host structure and the corresponding end of the PZT layer is zero.

f) Applied voltage is assumed uniform along the PZT.

g) Only harmonic, steady state vibration is considered.

h) Linear theories of elasticity, viscoelasticity, and piezoelectricity are used.

As can be appreciated by one skilled in the art, the model may be adjusted to include additional or different assumptions while still in accordance with the invention. The selection of particular assumptions would depend upon the particular application or use of the hybrid constrained layer of the present invention.

Figure 2:
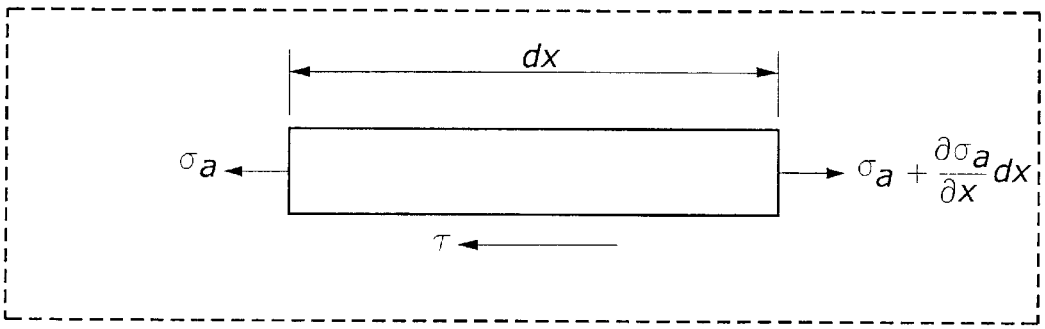
FIG. 2 is a free body diagram of an active constraining layer.

Using the above given assumptions and considering the equilibrium of the PZT section as shown in FIG. 2, the following equation of motion can be derived:

$$\rho_a \partial^2 u_a / \partial t^2 = \partial \sigma_a / \partial x - \tau / h_a \quad 0 < x < \alpha L \tag{1}$$

where $\sigma_a$ is the longitudinal stress at the neutral axis of the PZT, which, according to the constitutive equation of the PZT, can be expressed as:

$$\sigma_a = E_a \left( \frac{\partial u_a}{\partial x} - \Lambda \right) \tag{2}$$

Here, $\sigma_a$ is the strain of the PZT directly induced by the electric field, which is dependent on the control law used. $\tau$ is the shear stress in the VEM. In steady state, it can be written as $$\tau = G_v^* \gamma = G_{vl}(1 + i\eta_v)\gamma \tag{3}$$

where $G_v^*$ is the complex shear modulus of the VEM, $G_{vl}$ is the VEM storage modulus, and $\eta_v$ is the material loss factor.

For the system with longitudinal and transverse vibrations, the shear strain $\gamma$ in VEM can be calculated from the deformation of the base structure and the hybrid constraining layer as (Liu, Y., and Wang, K. W., 1999a, "A Non-dimensional Parametric Study of Enhanced Active Constrained Layer Damping Treatments," *Journal of Sound and Vibration*, Vol. 223, No.4, pp. 611–644):

$$\gamma = \begin{cases} \dfrac{u_a - u_b + h_l \dfrac{\partial w}{\partial x}}{h_v} & 0 \leq x \leq \alpha L \\ \dfrac{u_p - u_b + h_R \dfrac{\partial w}{\partial x}}{h_v} & \alpha L \leq x \leq L \end{cases} \tag{4}$$

Substituting Equations (2)–(4) into Equation (1) and considering assumption (f), the equation of motion of the active constraining part can be derived as $$\frac{\partial^2 u_a}{\partial x^2} - \frac{G_v^*\left(u_a - u_b + h_L \dfrac{\partial w}{\partial x}\right)}{E_a h_a h_v} = \frac{\rho_a}{E_a} \frac{\partial^2 u_a}{\partial t^2} \quad 0 < x < \alpha L \tag{5}$$

Similarly, for the passive constraining part, the equation of motion can be derived as $$\frac{\partial^2 u_p}{\partial x^2} - \frac{G_v^*\left(u_p - u_b + h_R \dfrac{\partial w}{\partial x}\right)}{E_p h_p h_v} = \frac{\rho_p}{E_p} \frac{\partial^2 u_p}{\partial t^2} \quad \alpha L < x < L \tag{6}$$

It can be seen from Equations (5) and (6) that the longitudinal displacements in the constraining layers are related to the host structure deformation. In this study, the host structure deformation is assumed given. Therefore, Equations (5) and (6) can be used to derive the deformation in the constraining layers. To do that, four conditions are needed since Equations (5) and (6) are two second-order equations. Modeling the anchor as an equivalent spring with stiffness $K_{eq}$ (FIG. 1), the boundary conditions for $u_a$ and $u_p$ can be written as:

$$E_a h_a b \left( \frac{\partial u_a}{\partial x} - \Lambda \right) = K_{eq} \left( u_a - u_b + h_L \frac{\partial w}{\partial x} \right) \quad x = 0 \tag{7}$$

$$\frac{\partial u_p}{\partial x} = 0 \quad x = L \tag{8}$$

At the connecting point of the active and passive constraining layers, the displacement and force are continuous. Therefore, $$u_a = u_p \quad x = \alpha L \tag{9}$$

$$E_a h_a \left( \frac{\partial u_a}{\partial x} - \Lambda \right) = E_p h_p \frac{\partial u_p}{\partial x} \quad x = \alpha L \tag{10}$$

Equations (5)–(10) are all the equations we need to solve for $u_a$ and $u_p$. In steady state, considering the separation of the variables in the forms of $$w(x,t) = W(x) e^{i\omega t} \tag{11}$$

$$u_b(x,t) = U_b(x) e^{i\omega t} \tag{12}$$

$$u_a(x,t) = U_a(x) e^{i\omega t} \tag{13}$$

$$u_p(x,t) = U_p(x) e^{i\omega t} \tag{14}$$

where $\omega$ is the excitation frequency in radians. Introducing the following non-dimensional parameters $$\Gamma_p^2 = \frac{G_v^* L^2}{E_p h_p h_v} \tag{15}$$

$$\Gamma_a^2 = \frac{G_v^* L^2}{E_a h_a h_v} \tag{16}$$

$$\Omega_p^2 = \frac{\rho_p L^2 \omega^2}{E_p} \tag{17}$$

$$\Omega_a^2 = \frac{\rho_a L^2 \omega^2}{E_a} \tag{18}$$

$$K = \frac{K_{eq} L}{E_a h_a b} \tag{19}$$

$$S_p = \frac{E_p h_p}{E_a h_a} = \frac{\Gamma_a^2}{\Gamma_p^2} \tag{20}$$

Equations (5)–(10) can be written as:

$$\frac{d^2 \overline{U}_a}{d\overline{x}^2} - (\Gamma_a^2 - \Omega_a^2)\overline{U}_a = -\Gamma_a^2 \left( \overline{U}_b - \theta_L \frac{d\overline{W}}{d\overline{x}} \right) \quad 0 < \overline{x} < \alpha \tag{21}$$

$$\frac{d^2 \overline{U}_p}{d\overline{x}^2} - (\Gamma_p^2 - \Omega_p^2)\overline{U}_p = -\Gamma_p^2 \left( \overline{U}_b - \theta_R \frac{d\overline{W}}{d\overline{x}} \right) \quad \alpha < \overline{x} < 1 \tag{22}$$

$$\frac{d\overline{U}_a}{d\overline{x}} - \frac{\Lambda}{e^{i\omega t}} = K\left( \overline{U}_a - \overline{U}_b + \theta_L \frac{d\overline{W}}{d\overline{x}} \right) \quad \overline{x} = 0 \tag{23}$$

$$\frac{d\overline{U}_p}{d\overline{x}} = 0 \quad \overline{x} = 1 \tag{24}$$

$$\overline{U}_a = \overline{U}_p \quad \overline{x} = \alpha \tag{25}$$

$$\frac{d\overline{U}_a}{d\overline{x}} - \frac{\Lambda}{e^{i\omega t}} = S_p \frac{d\overline{U}_p}{d\overline{x}} \quad \overline{x} = \alpha \tag{26}$$

Here, $\Gamma_a$ is the non-dimensional complex characteristic length of the treatment when $\alpha = 1$ (characteristic length for the pure active constraining layer), and $\Gamma_p$ is the non-dimensional complex characteristic length of the treatment when $\alpha=0$ (characteristic length for the pure passive constraining layer). $\Omega_a$ is the non-dimensional characteristic frequency of the active constraining layer, and $\Omega_p$ is the non-dimensional characteristic frequency of the passive constraining layer. K is the non-dimensional anchor stiffniess. $S_p$ is the ratio of the extensional stiffniess of the passive and active constraining layers. Larger $S_p$ implies that the passive constraining part is stiffer, relative to the active part. We will see later that $S_p$ has a significant effect on the performance of the HCL treatment. Other parameters are defined in the nomenclature.

In general, for thin damping treatment and low frequency, the following approximations can be used.

$$\frac{\Omega_p^2}{\Gamma_p^2} \ll 1 \tag{27}$$

$$\frac{\Omega_a^2}{\Gamma_a^2} \ll 1 \tag{28}$$

Therefore, Equations (21) and (22) can be simplified as $$\frac{d^2 \overline{U}_a}{d\overline{x}^2} - \Gamma_a^2 \overline{U}_a = -\Gamma_a^2 \left( \overline{U}_b - \theta_L \frac{d\overline{W}}{d\overline{x}} \right) \quad 0 < \overline{x} < \alpha \tag{29}$$

$$\frac{d^2 \overline{U}_p}{d\overline{x}^2} - \Gamma_p^2 \overline{U}_p = -\Gamma_p^2 \left( \overline{U}_b - \theta_R \frac{d\overline{W}}{d\overline{x}} \right) \quad \alpha < \overline{x} < 1 \tag{30}$$

The strain field in the host structure may be assumed to be a given input, which is linearly distributed along the thickness and length directions as:

$$\varepsilon(x, z, t) = \frac{\partial u_b}{\partial x} - z \frac{\partial^2 w}{\partial x^2} = (C_{z0} + C_{z1} z)(C_{x0} + C_{x1} \overline{x}) e^{i\omega t} \tag{31}$$

By selecting different number combination for $C_{x0}$, $C_{x1}$, $C_{z0}$ and $C_{z1}$, we can define longitudinal or transverse motion of the host structure. For example, when $C_{z1}=C_{x1}=0$, the strain in the host structure is constant and the structure is under pure longitudinal vibration (Liu, Y., and Wang, K. W., 1999b, "Surface Damping Treatment with an Active-Passive Hybrid Constraining Layer," Proceedings of the 1999 ASME Design Engineering Technical Conferences, DETC/VIB-8301). We will let $C_{z0}=C_{x1}=0$, $C_{z1}=C_{x0}=1$, which represents pure bending of the host structure. From Equation (31), the following relations can be derived $$\overline{U}_b - \theta_L \frac{d\overline{W}}{d\overline{x}} = (C_{z0} + C_{z1} \theta_L)\left( Const + C_{x0} \overline{x} + \frac{1}{2} C_{x1} \overline{x}^2 \right) \tag{32}$$

$$\overline{U}_b - \theta_R \frac{d\overline{W}}{d\overline{x}} = (C_{z0} + C_{z1} \theta_R)\left( Const + C_{x0} \overline{x} + \frac{1}{2} C_{x1} \overline{x}^2 \right) \tag{33}$$

Substituting Equations (32) and (33) into Equations (29) and (30), the general solutions to the equations of motion are $$\overline{U}_a = A\cosh(\Gamma_a \overline{x}) + B\sinh(\Gamma_a \overline{x}) + \tag{34}$$
$$(C_{z0} + C_{z1} \theta_L)\left( Const + \frac{C_{x1}}{\Gamma_a^2} + C_{x0} \overline{x} + \frac{C_{x1}}{2} \overline{x}^2 \right)$$

$$\overline{U}_p = C\cosh(\Gamma_p \overline{x}) + D\sinh(\Gamma_p \overline{x}) + \tag{35}$$
$$(C_{z0} + C_{z1} \theta_R)\left( Const + \frac{C_{x1}}{\Gamma_p^2} + C_{x0} \overline{x} + \frac{C_{x1}}{2} \overline{x}^2 \right)$$

Substituting Equations (32)–(35) into (4), the shear in VEM can be written as $$\frac{\gamma}{e^{i\omega t}} = \begin{cases} \dfrac{A\cosh(\Gamma_a \overline{x}) + B\sinh(\Gamma_a \overline{x}) + \dfrac{C_{x1}}{\Gamma_a^2} + (C_{z0} + C_{z1}\theta_R)}{\theta_v} & 0 \leq \overline{x} \leq \alpha \\ \dfrac{C\cosh(\Gamma_p \overline{x}) + D\sinh(\Gamma_p \overline{x}) + \dfrac{C_{x1}}{\Gamma_p^2}(C_{z0} + C_{z1}\theta_R)}{\theta_v} & \alpha \leq \overline{x} \leq 1 \end{cases} \tag{36}$$

Here, $\theta_v$ is the non-dimensional thickness of the VEM layer. A, B, C and D are constants to be determined by the boundary and connecting conditions.

In order to solve for constants A, B, C and D, the control law has to be decided first. Here, the self-sensing control method proposed by Dosch, J. J., Inman, D. J. and Garcia, E., 1992, "A Self-Sensing Piezoelectric Actuator for Collocated Control," *Journal of Intelligent Systems and Structures*, Vol.3, pp. 166–185; Shen, I. Y., 1997, "A Variational Formulation, a Work-Energy Relation and Damping Mechanisms of Active Constrained Layer Treatments," *ASME Journal of Vibration and Acoustics*, Vol. 119, pp. 192–199; and Baz, A., 1997, "Optimization of Energy Dissipation Characteristics of Active Constrained Layer Damping," *Smart Materials and Structures*, Vol.6, pp. 360–368; is used:

$$\Lambda = K_g\left[ \frac{\partial u_a(0,t)}{\partial t} - \frac{\partial u_a(\alpha L, t)}{\partial t} \right] = iG[\overline{U}_a(0) - \overline{U}_a(\alpha)] e^{i\omega t} \tag{37}$$

where $K_g$ is the control gain, and G is the non-dimensional control gain defined as $$G = K_g L \omega \tag{38}$$

While more advanced control laws could be employed, this simple scheme guarantees the stability of the system so that we can concentrate on the performance of the treatments. Substituting Equations (32), (34), (35) and (37) into Equations (23)–(26), constants A, B, C and D can be derived.

For the self-sensing control law used here, the energies dissipated per cycle by passive damping ($W_p$) and by active control ($W_a$) can be expressed, respectively, as (Baz, A., 1997, "Optimization of Energy Dissipation Characteristics of Active Constrained Layer Damping," *Smart Materials and Structures*, Vol.6, pp. 360–368; Shen, I. Y., 1997, "A Variational Formulation, a Work-Energy Relation and Damping Mechanisms of Active Constrained Layer Treatments," *ASME Journal of Vibration and Acoustics*, Vol.119, pp. 192–199):

$$W_p = \pi \eta_v G_{v1} h_v b L \int_0^1 |\gamma|^2 d\overline{x} \tag{39}$$

$$W_a = \pi G E_a h_a b L |\overline{U}_a(0) - \overline{U}_a(\alpha)|^2 \tag{40}$$

Passive loss factor $\eta_p$ and active loss factor $\eta_a$ of the HCL treatment are defined as $$\eta_p = \frac{W_p}{2\pi W_s} \quad (41)$$

$$\eta_a = \frac{W_a}{2\pi W_s} \quad (42)$$

where $W_s$ is the maximum strain energy stored in the host structure, active and passive constraining layers, viscoelastic material, and the anchor, which can be expressed as $$W_s = \frac{E_a h_a b L}{2} \left\{ \frac{\theta_a^2}{12}(1-D_p)\left(C_{x0}^2\alpha + C_{x0}C_{x1}\alpha^2 + \frac{C_{x1}^2}{3}\alpha^3\right)C_{z1}^2 + \right. \quad (43)$$

$$S_b C_{z0}^2 + \frac{\theta_a^2 C_{z1}^2}{12}(D_b + D_p)\bigg](C_{x0}^2 + C_{x0}C_{x1} + \frac{C_{x1}^2}{3}) +$$

$$\int_0^a \left|\frac{d\overline{U}_a}{d\overline{x}}\right|^2 d\overline{x} + S_p \int_a^1 \left|\frac{d\overline{U}_p}{d\overline{x}}\right|^2 d\overline{x} +$$

$$\left. \text{Re}[\Gamma_a^2]\theta_v^2 \int_0^1 |\gamma|^2 d\overline{x} + K\left|\overline{U}_a(0)\overline{U}_b(0) + \theta_L \frac{d\overline{W}(0)}{d\overline{x}}\right|^2 \right\}$$

Here, $S_b$ is the extensional stiffness ratio between the host structure and the active constraining layer.

$$S_b = \frac{E_b h_b}{E_a h_a} \quad (44)$$

$D_b$ is the bending stiffness ratio between the host structure and the active constraining layer; and $D_p$ is the bending stiffness ratio between the passive constraining layer and active constraining layer.

$$D_b = \frac{E_b I_b}{E_a I_a} = \frac{E_b h_b^3}{E_a h_a^3} \quad (45)$$

$$D_p = \frac{E_p I_p}{E_a I_a} = \frac{E_p h_p^3}{E_a h_a^3} \quad (46)$$

Total system (hybrid) loss factor $\eta_s$ is the summation of the passive and active loss factors.

$$\eta_s = \eta_p + \eta_a \quad (47)$$

The hybrid loss factor, $\eta_s$ is the overall ability of the treatment to dissipate energy. The active loss factor, $\eta_a$, reflects the direct active control authority of the piezoelectric layer on the host structure. The passive loss factor, $\eta_p$, reflects the passive damping ability of the treatment through VEM shear deformation. For the closed-loop system (G>0), this includes the open-loop damping of the baseline structure (G=0) plus the enhanced passive damping due to the additional VEM deformation induced by the active PZT action. When the control gain G is zero (open-loop), $\eta_a$ will be zero, and $\eta_p$ will only contain passive damping of the baseline structure, which is defined to be the open-loop loss factor, $\eta_{op}$. The value of $\eta_{op}$ reflects the fail-safe ability of the treatment.

From the definition of the loss factors, it can be found that HCL damping properties are determined by independent parameters $\Gamma_a$, K, G, $\alpha$, $D_p$, $S_p$, $D_b$, $S_b$, $\theta_L$, $\theta_R$, and $\theta_a$. The nominal values of these parameters used in the analysis are listed in the following table unless stated otherwise.

| | |
|---|---|
| $\alpha = [0, 1]$ | G = 0 or optimal |
| $\Gamma_\alpha = 2.8 e^{\pi i/8}$ | K = 0 or 100 |
| $S_p = 3$ | $S_b = 9$ |
| $D_p = 3$ | $D_b = 400$ |
| $\theta_\alpha = 0.005$ | $\theta_L = \theta_R = 0.024$ |

Figure 3A:
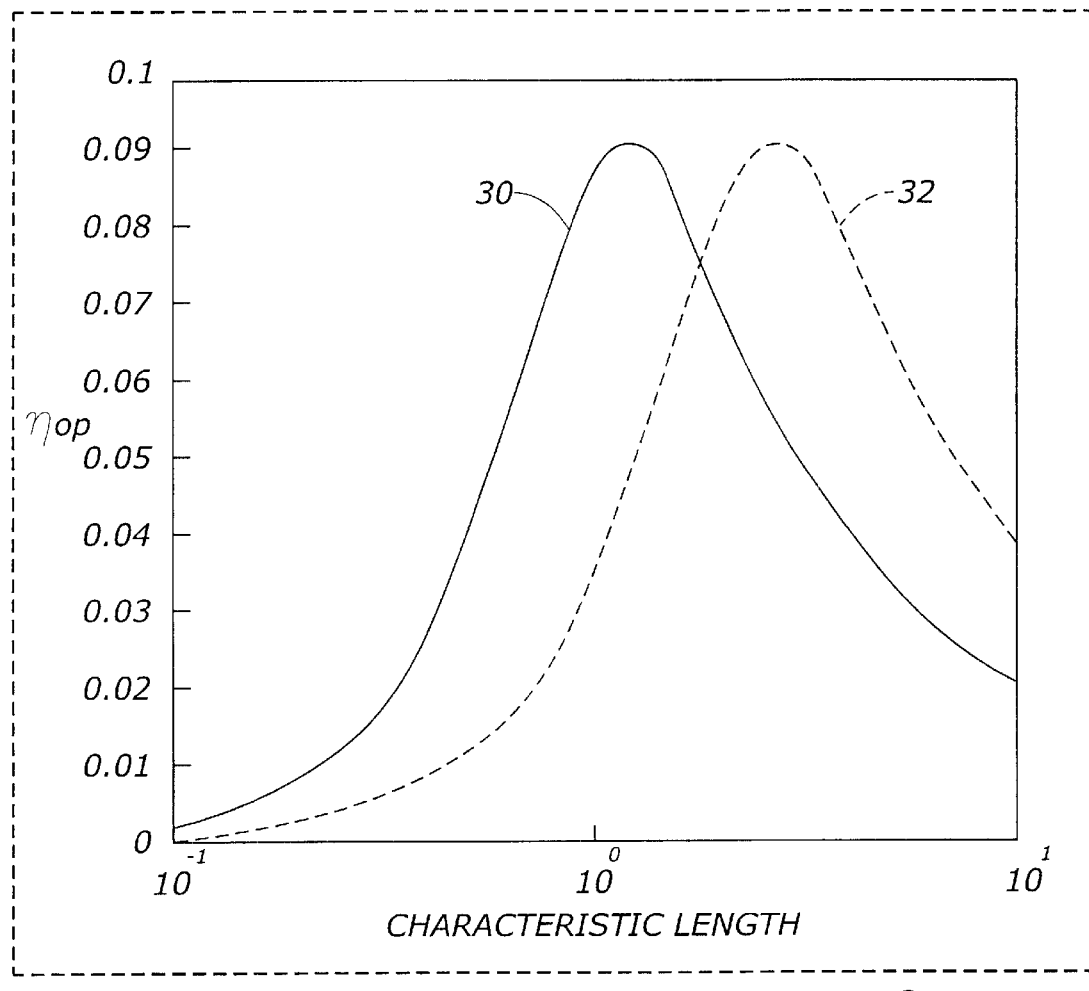
FIG. 3A is a graph showing open-loops loss factor versus characteristic length for treatment with a PZT constraining layer.
Figure 3B:
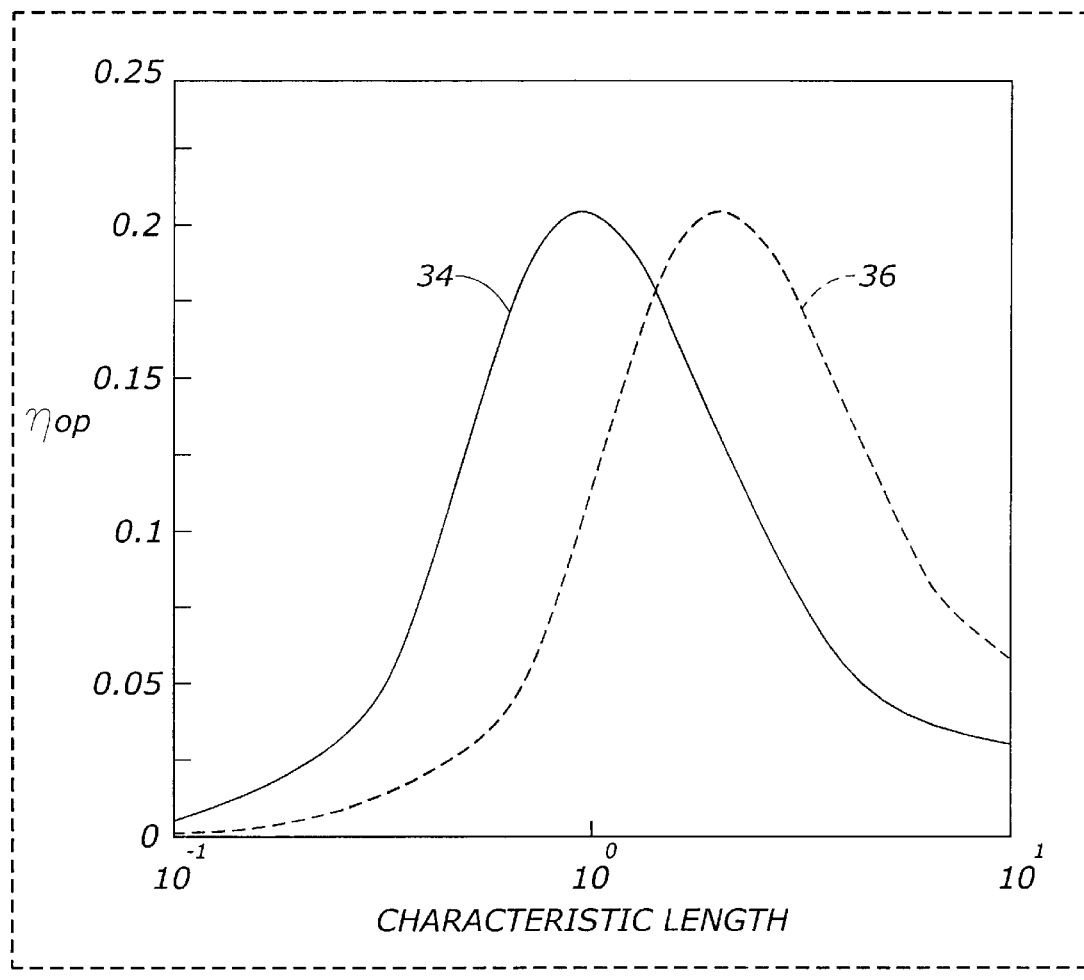
FIG. 3B is a graph of open-loop loss factor versus characteristic length for a steel constraining layer.

We will mainly focus on the effects of $\alpha$, $D_p$ and $S_p$ on the open-loop and closed-loop damping properties of the HCL treatment. In FIGS. 3a and 3b, the open-loop loss factor $\eta_{op}$ ($\eta_{op} = \eta_p$ since G=0) is shown for the treatment with two different constraining layers. FIG. 3a shows a PZT constraining layer. FIG. 3b shows a steel constraining layer. In FIG. 3a, both treatment with an anchor 30 (K=1000) and treatment without an anchor 32 are shown. Similarly, in FIG. 3b, both treatment with an anchor 34 (K=1000) and treatment without an anchor 36 are shown. With both PZT and steel constraining layers, there is an optimal characteristic length $|\Gamma_a|$ (or $|\Gamma_p|$) to maximize $\eta_{op}$ (Plunkett, R., and Lee, C. T., 1970, "Length Optimization for Constrained Viscoelastic Layer Damping," *Journal of the Acoustical Society of America* Vol.48, No.1, Part 2, 150–161; Baz, A., 1997, "Optimization of Energy Dissipation Characteristics of Active Constrained Layer Damping," *Smart Materials and Structures*, Vol.6, pp. 360–368 Liu, Y., and Wang, K. W., 1999a, "A Non-dimensional Parametric Study of Enhanced Active Constrained Layer Damping Treatments," *Journal of Sound and Vibration*, Vol. 223, No.4, pp. 611–644). However, when both treatments are designed to operate at their optimal characteristic length, the treatment with a steel constraining layer obtains higher damping than the treatment with a PZT constraining layer.

It can be seen from both FIG. 3A and FIG. 3B that the anchor merely has the effect of shifting the optimal characteristic length of the treatment in the open-loop system. It will not change the maximum open-loop loss factor. It is also worth noting that the optimal characteristic length of the treatment when the system is under pure bending is different from that when the system is under pure axial motion. In general, the strain field of the host structure should be considered in the design of the optimal characteristic length for the open-loop system.

Figure 4:
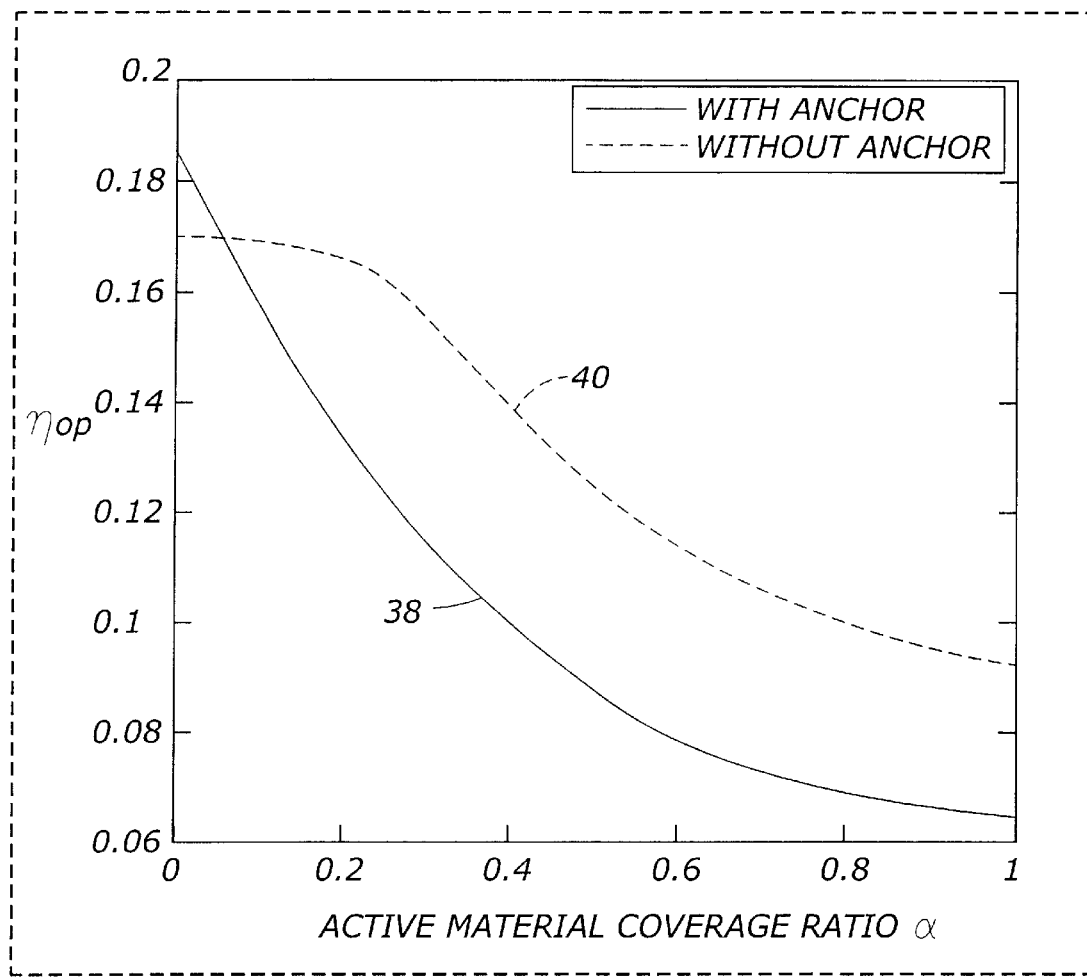
FIG. 4 is a graph of open-loop loss factor versus active material coverage ratio.

Since the treatment with a steel constraining layer can obtain higher open-loop damping than the treatment with a PZT constraining layer, the open-loop damping performance or fail-safe property of the damping treatment with a pure PZT coversheet can be improved by replacing part of the PZT coversheet by steel. In FIG. 4, the effect of the active material coverage ratio $\alpha$ on the open-loop loss factor is shown. It is clear that the smaller the a, the larger the loss factor $\eta_{op}$. In other words, mixing the stiffer passive material into the coversheet will enhance the fail-safe ability of the treatment. This is relationship is shown both with an anchor 38 and without an anchor 40.

Although smaller a would achieve higher open-loop damping, it is not desirable to design a treatment with a very small $\alpha$ since this could reduce the active and hybrid (closed-loop) damping actions. In other words, not only the open-loop damping but also the closed-loop damping of the system should be considered before a suitable a can be selected.

In a closed-loop system, the system hybrid loss factor is the combined effect of active and passive dampings as defined in Equation (47). For the self-sensing algorithm used in this embodiment, there is an optimal control gain G to maximize the hybrid loss factor. When this optimal gain is used, a range of α can be found (0<α<1) such that the HCL hybrid loss factor is larger than the hybrid loss factor of the system with a pure PZT coversheet (α=1). The HCL damping ability is further improved by selecting appropriate $S_p$ and $D_p$. Details of the analysis are discussed in the following paragraphs.

Figure 5A:
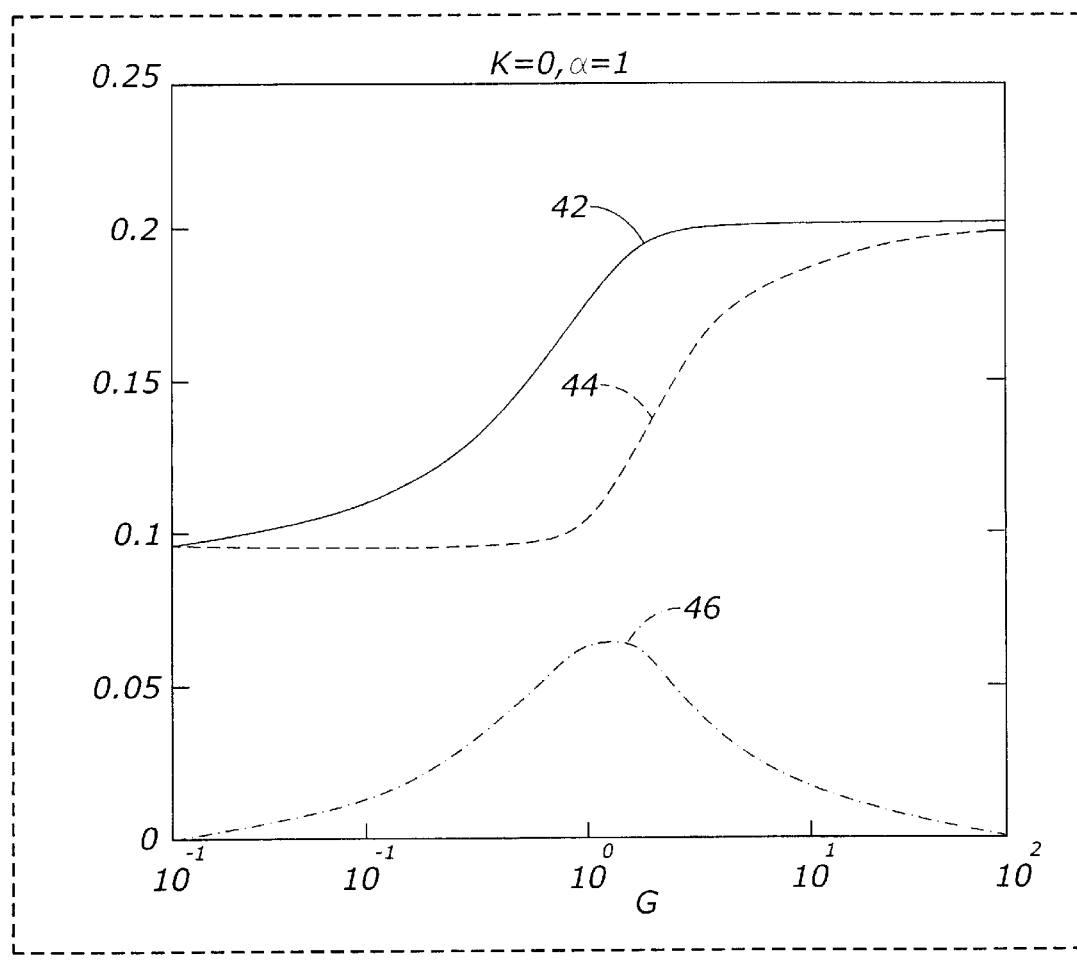
FIG. 5A is diagram of loss factors versus control gain G for treatment without the anchor.
Figure 5B:
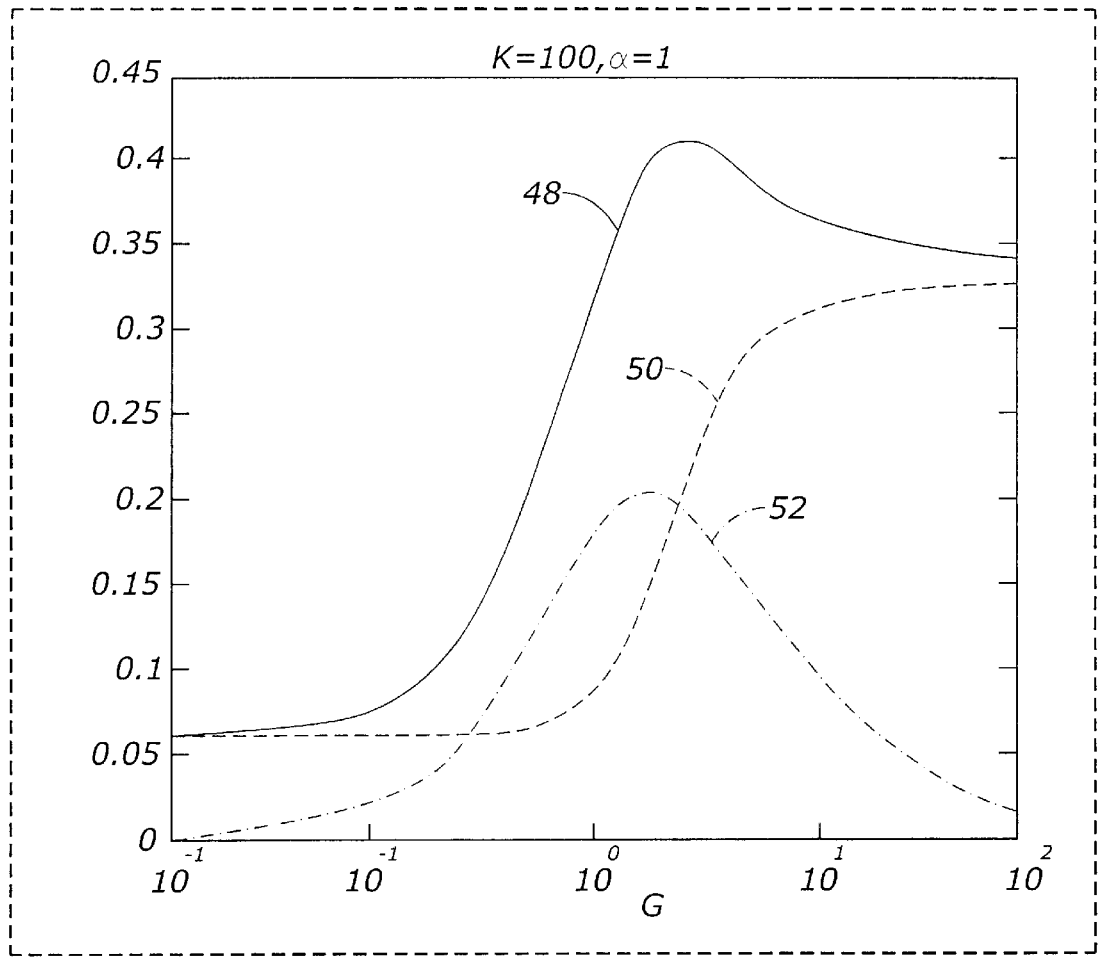
FIG. 5B is a graph of loss factors versus control gain G for treatment with an anchor.

FIG. 5A illustrates the effect of the control gain G on the active 46, passive 44 and hybrid 42 loss factors of treatments with a pure active coversheet (α=1) without anchor. FIG. 5B illustrates the effect of the control gain G on the active 52, passive 50 and hybrid loss 48 factors of treatments with a pure active coversheet (α=1) with anchor. Obviously, there exists an optimal G for maximizing $\eta_s$. When the control gain becomes sufficiently large, the active loss factor approaches zero and the passive loss factor saturates (Liu, Y., and Wang, K. W., 1999a, "A Non-dimensional Parametric Study of Enhanced Active Constrained Layer Damping Treatments," *Journal of Sound and Vibration*, Vol. 223, No.4, pp. 611–644). In the following studies, optimal control gains for maximizing the hybrid loss factor are used, unless specified otherwise.

Figure 6A:
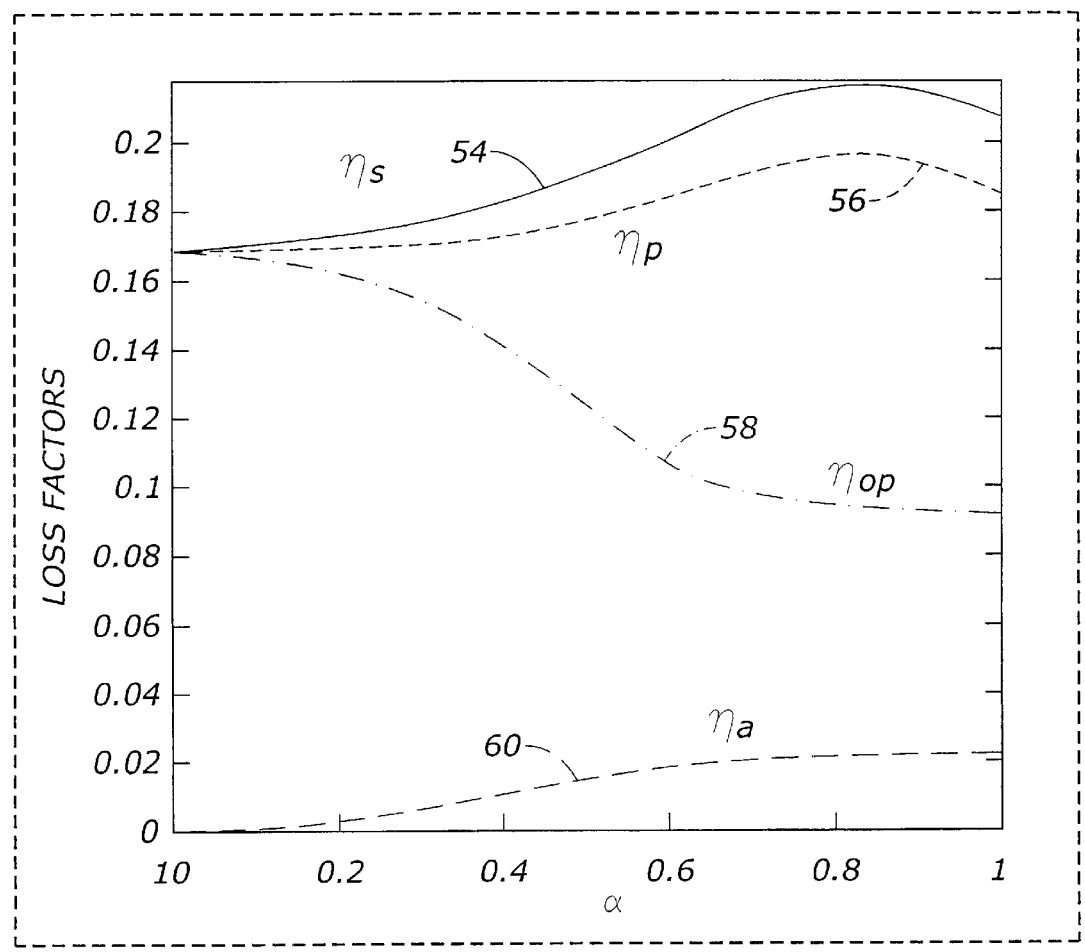
FIG. 6A is a graph of loss factors versus active material coverage ratio for treatment without the anchor (K=0).
Figure 6B:
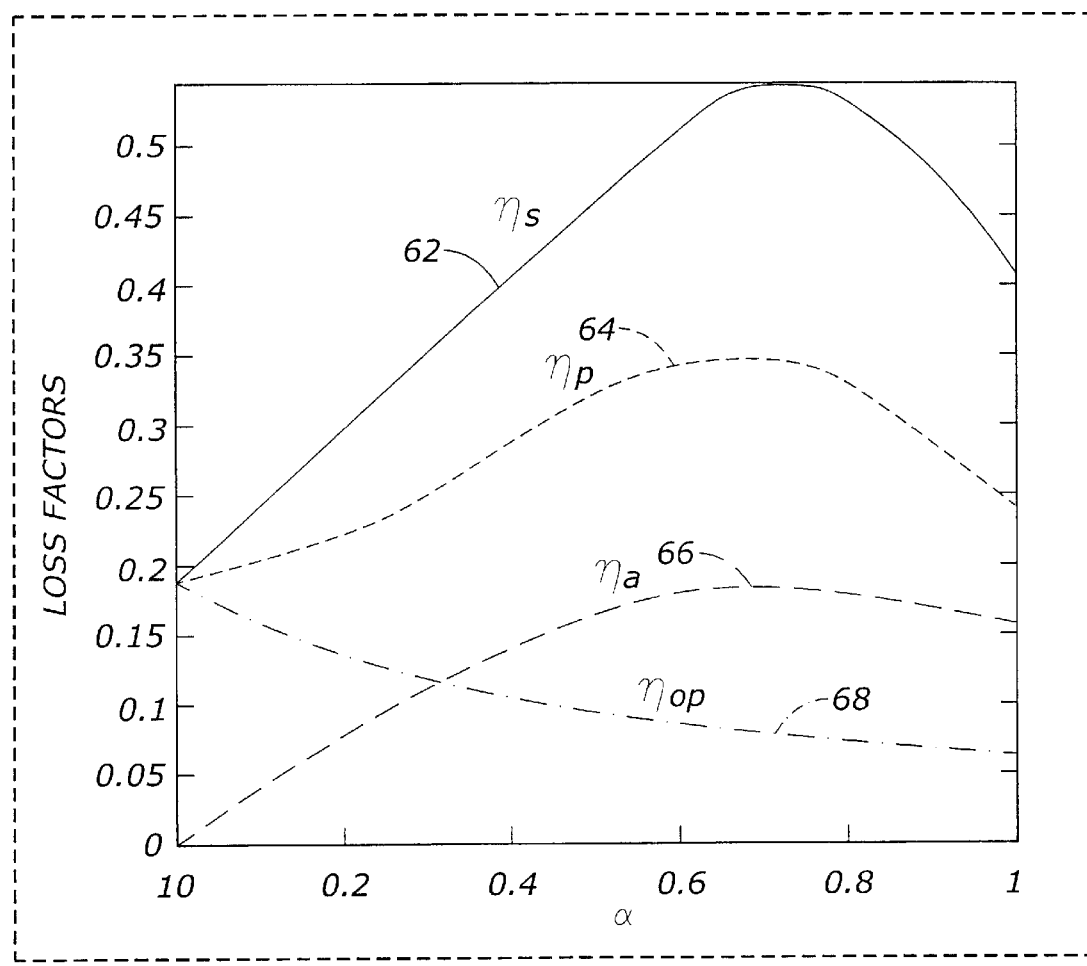
FIG. 6B is a graph of loss factors versus active material coverage ratio for treatment with the anchor (K=100).

With the application of the optimal control gain, a range of α exists such that the HCL system can obtain higher damping than the system with a pure PZT coversheet. FIG. 6A shows the loss factors versus active material coverage ratio α for loss factors where the treatment is applied without an anchor (K=0). The hybrid loss factor 54, active loss factor 60, passive loss factor 56, and open-loop loss factor 58 are shown. Similarly, FIG. 6B shows the loss factors versus active material coverage ratio α for loss factors where treatment is applied with an anchor (K=1000). The hybrid loss factor 62, active loss factor 66, passive loss factor 64, and open-loop loss factor 68 are shown.

Figure 7:
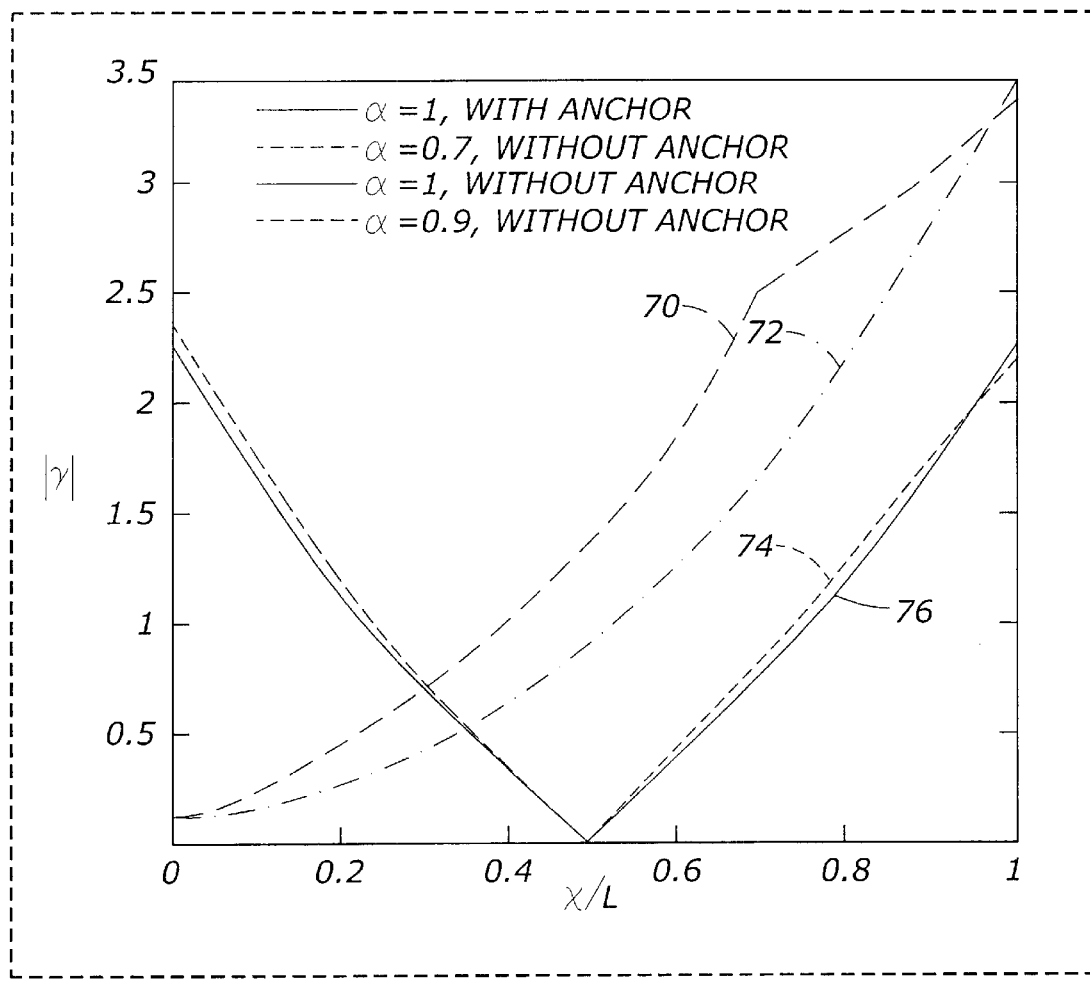
FIG. 7 is a graph of shear distribution of the closed- loops systems in the VEM layer.
Figure 8:
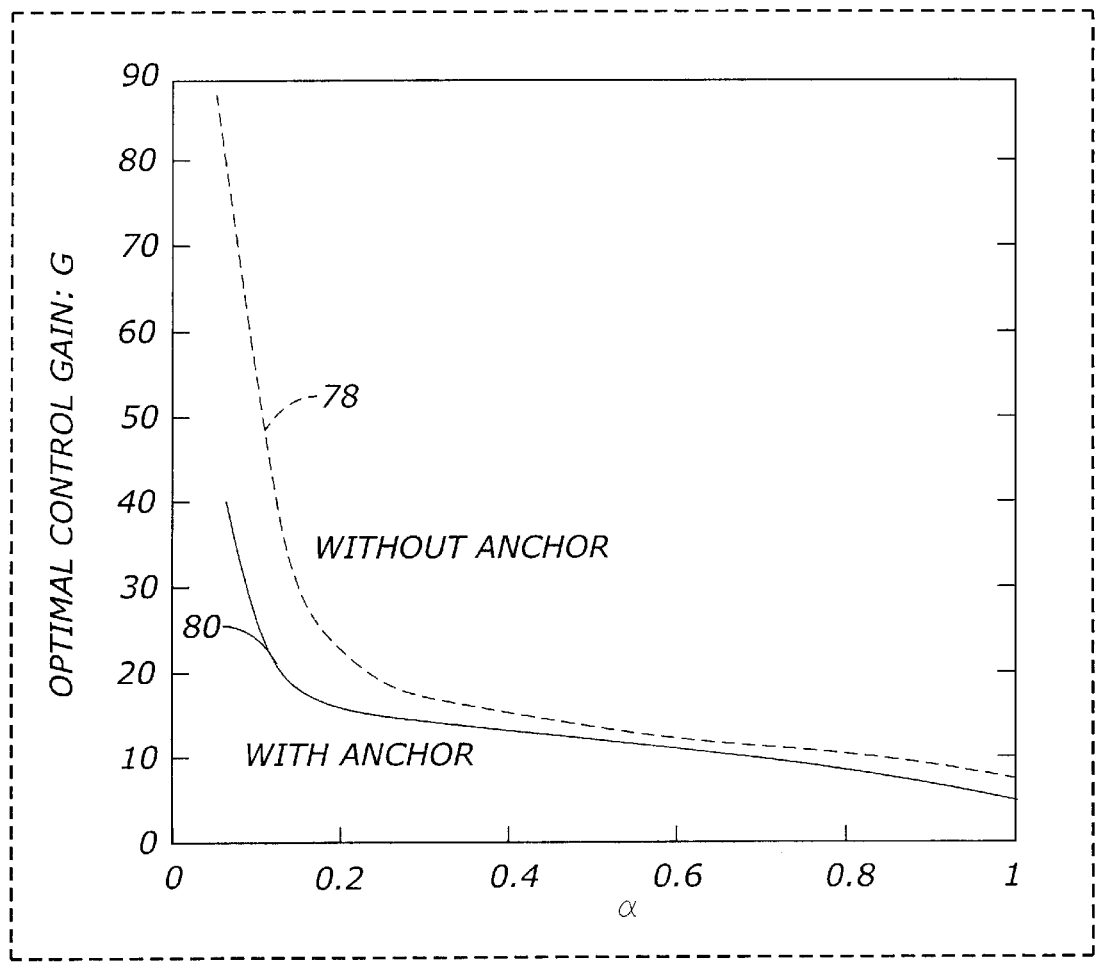
FIG. 8 is a graph of dimension with optimal control gain G versus the active material coverage ratio α.

As shown in FIGS. 6A and 6B, when α is large enough but still less than 1, HCL has a higher hybrid loss factor than that of a system with α=1. The reason behind this is that we are gaining significantly from the increase in passive damping (open-loop damping plus the enhanced passive damping from additional VEM deformation), and are still doing well in terms of active damping (active action from PZT coversheet to host structure). Also from FIGS. 6A and 6B, when α is close to 1, HCL obtains higher passive damping than the system with a pure PZT coversheet (α=1). To better understand this phenomenon, FIG. 7 plots the shear deformation in VEM for the closed-loop system when the optimal control gain is applied for each selection of α. Shear distribution of the closed-loop systems in the VEM layer are plotted for α=1 with anchor 72, α=0.7 with anchor 70, α=1 without anchor 76, and α=0.9 without anchor 74. The inclusion of the stiffer passive material in the constraining layer has the effect of pushing the VEM shear deformation curve higher, which will increase the system's passive damping ability. On the other hand, the active damping for HCL is close to or higher than that of the case with α=1 as shown in FIGS. 6A and 6B. From Equation (40), the energy dissipated per cycle through the active control action is proportional to the non-dimensional control gain G and the square of the displacement difference at the ends of the active constraining layer. Although the implementation of the active-passive hybrid constraining layer could slightly reduce the displacement difference, the increase of the optimal control gain shown in FIG. 8 (both with anchor 80 and without anchor 78) in the case of hybrid constraining layer can actually compensate for that reduction, as long as the active material coverage ratio α is not too small, as shown in FIG. 6 for the active loss factor. Because of the combined effects of the passive and active loss factors, HCL can provide higher overall damping (higher than cases with purely active or passive constraining layers), when an optimal α(0<α<1) is used.

Figure 9A:
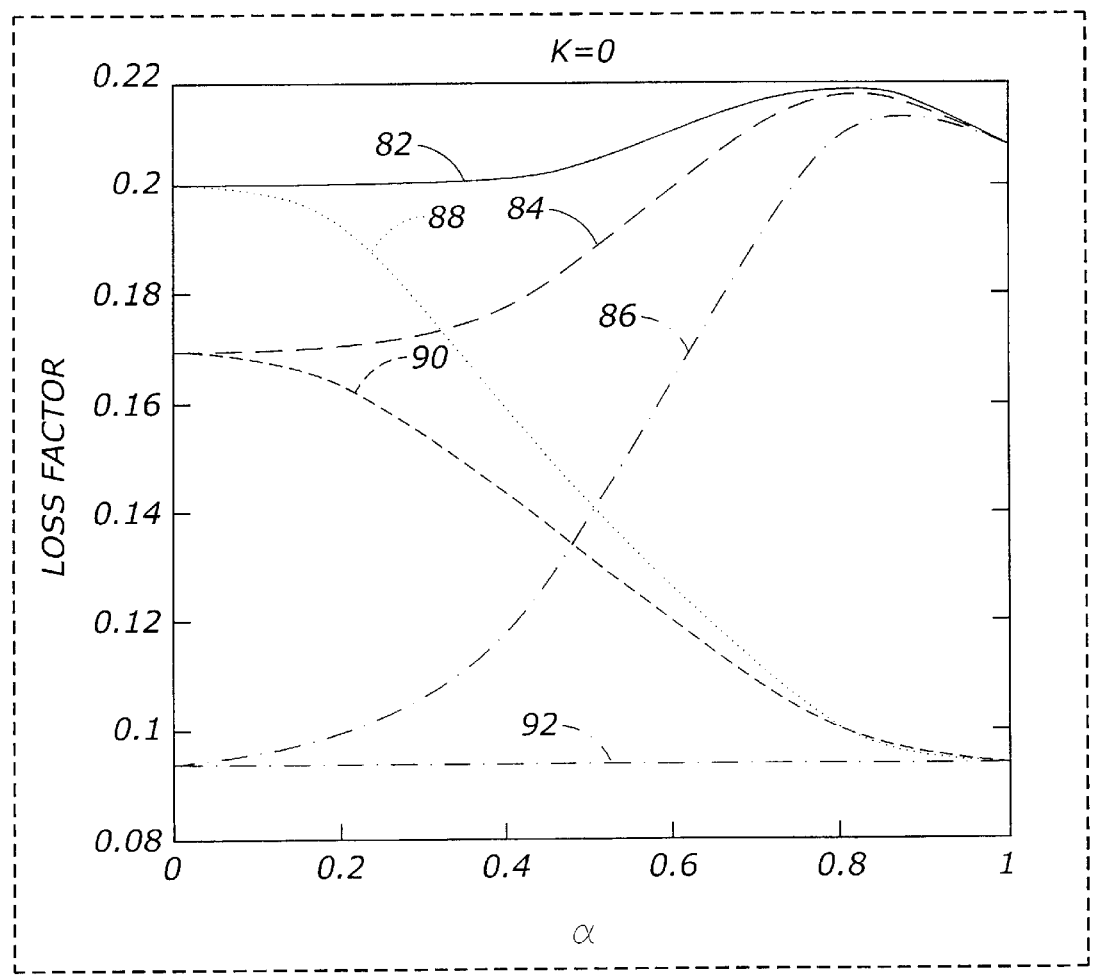
FIG. 9A is a graph of HCL hybrid loss factor $\eta_s$ and open-loop loss factor $\eta_{op}$ versus α for different $S_p$ for treatment without the anchor.
Figure 9B:
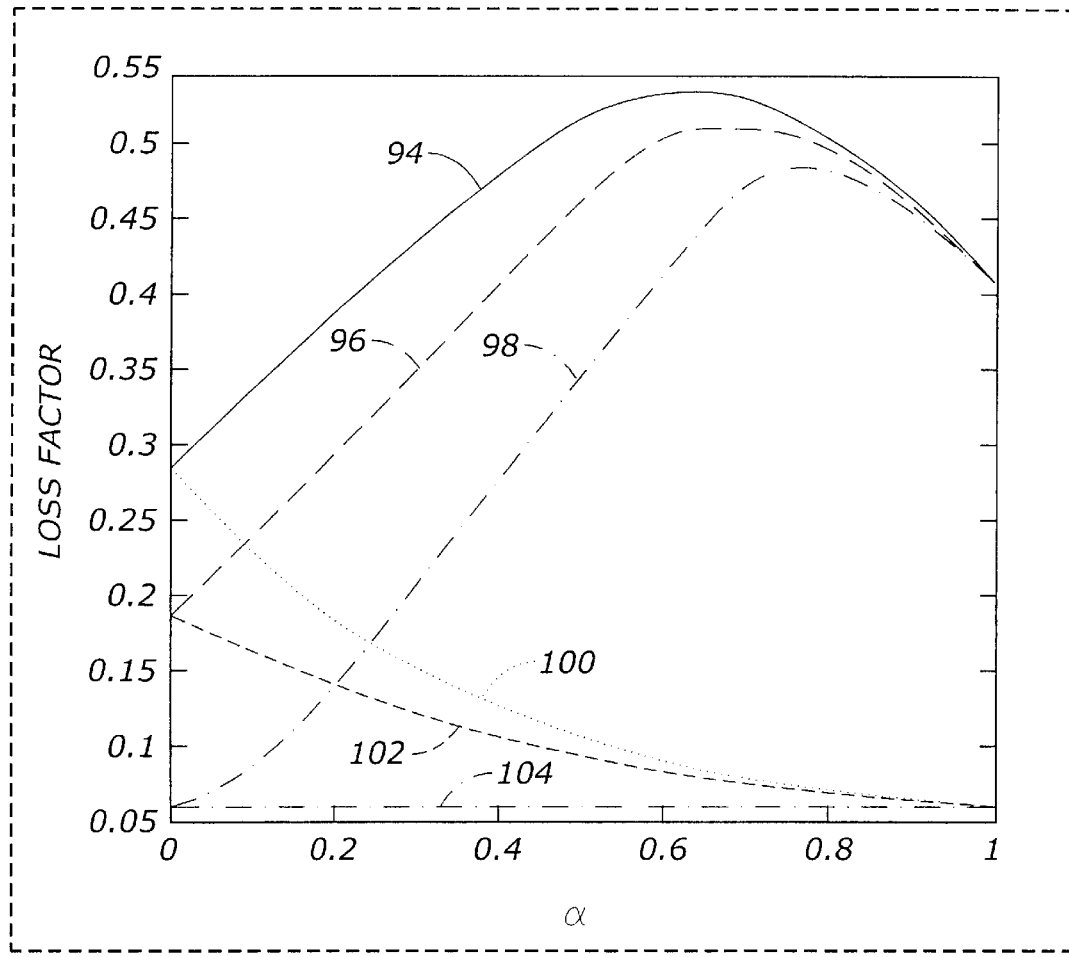
FIG. 9B is a graph of HCL hybrid loss factor $\eta_s$ and open-loop loss factor $\eta_{op}$ versus α for different $S_p$ for Treatment with the anchor.

FIGS. 9A and 9B show the hybrid loss factor as a function of α when different $S_p$ are selected. In this embodiment, it is assumed that the active and passive constraining layers have the same thickness. Of course, the present invention contemplates varying shapes and dimensions of the active and passive constraining layers. Therefore, $D_p$ is also changed accordingly. For $S_p$=1, 3 and 6, it is comparable to using aluminum, steel, and aluminum oxide ($Al_2O_3$), respectively, as the passive constraining material with the same thickness as the active one. In FIG. 9A, plot line 82 shows $S_p$=6 for the HCL hybrid loss, plot line 88 shows $S_p$=6 for the open-loop loss, plot line 90 shows $S_p$=3 for the open-loop loss, plot line 84 shows $S_p$=3 for the HCL hybrid loss, plot line 92 shows $S_p$=1 for the open-loop loss, and plot line 86 shows $S_p$=1 for the HCL hybrid loss. In FIG. 9B, plot line 94 shows $S_p$=6 for the HCL hybrid loss, plot line 100 shows $S_p$=6 for the open-loop loss, plot line 102 shows $S_p$=3 for the open-loop loss, plot line 96 shows $S_p$=3 for the HCL hybrid loss, plot line 104 shows $S_p$=1 for the open-loop loss, and plot line 98 shows $S_p$=1 for the HCL hybrid loss.

FIGS. 9A and 9B illustrate that the inclusion of a passive material in the constraining layer can provide more flexibility in the surface damping treatment design to satisfy different requirements. FIG. 9A shows treatment without an anchor (K=0). FIG. 9B shows treatment with an anchor (K=100). For example, for systems with severe weight constraints, one can reduce the added weight of a treatment with a pure PZT coversheet by replacing part of the PZT (density is 7500 kg/m$^3$) with aluminum (density is 2700 kg/m$^3$) as constraining material. Since the aluminum has a Young's modulus (E=0.9×10$^{10}$) that is almost the same as that of PZT (E=6.3×10$^{10}$ for PZT 850 from APC) but is much lighter, one can achieve better damping properties with less add-on weight (see FIG. 9 for $S_p$=1). On the other hand, for systems with higher damping requirements but less weight constraints, steel (E=2.0×10$^{11}$) or aluminum oxide (E=3.9×10$^{11}$) can be used as the passive constraining materials. Steel (density is 7600 kg/m$^3$) is almost the same weight as PZT, and aluminum oxide (density is 4000 kg/m$^3$) is lighter than PZT. The damping performance of such HCL treatments can be much better than the treatments with purely active PZT coversheets, as shown in FIG. 9 for $S_p$=3 and $S_p$=6. Another advantage of selecting a stiffer passive constraining material is that the optimal value of α where HCL obtains the maximum $\eta_s$ becomes smaller. This indicates that such HCLs will also have higher fail-safe ability since larger $\eta_{op}$ can be obtained at where optimal α is selected (compare the $S_p$=3 and 6 cases with $S_p$=1 in FIG. 9). It is worth noting that a larger $S_p$ can also be achieved by increasing the passive coversheet thickness.

The mathematical models of the hybrid damping of the present invention were verified through experimental efforts and test results.

Figure 10:
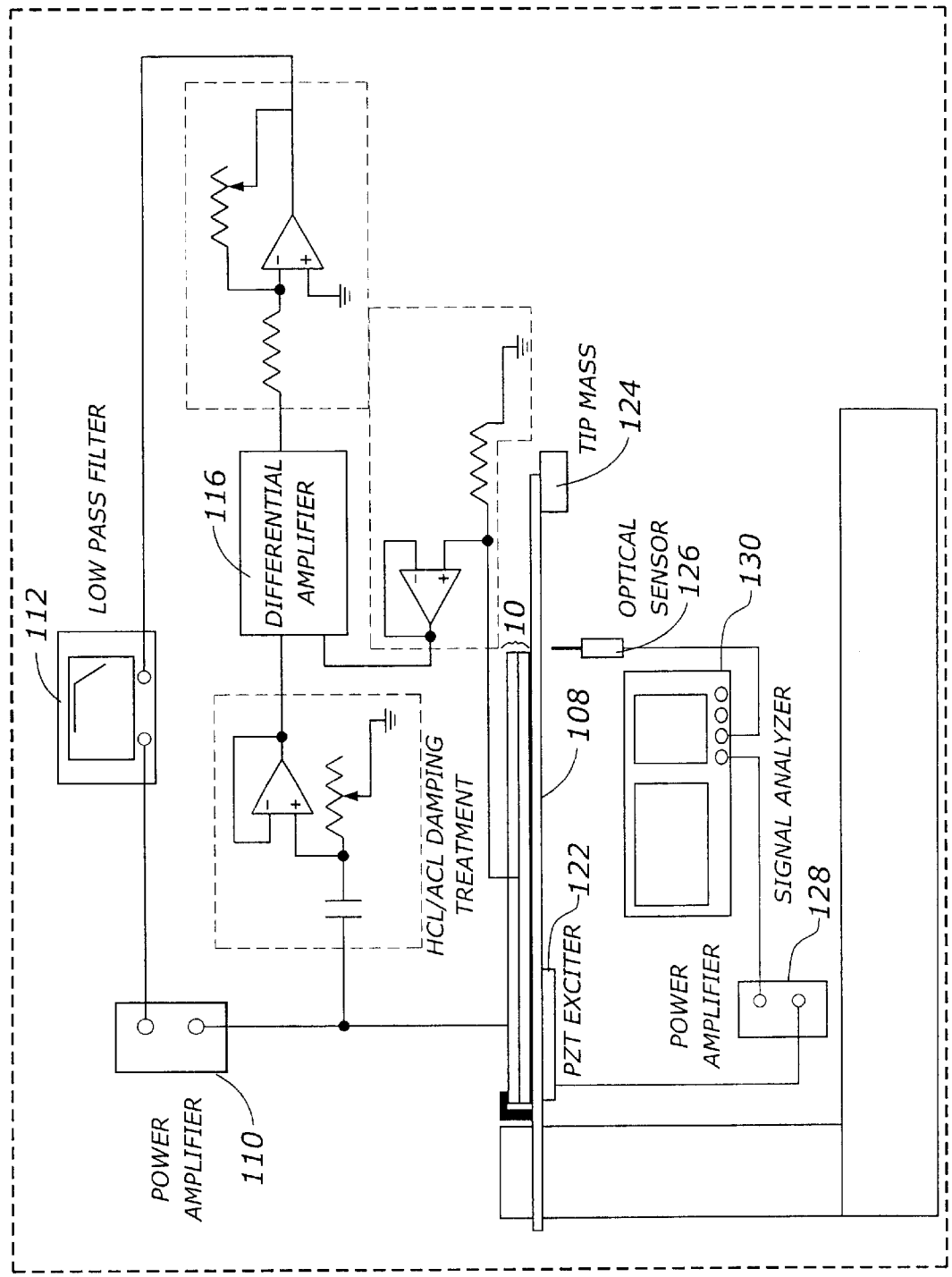
FIG. 10 is a diagram of one experimental set-up.

The experiments are conducted on cantilever beams. As shown in FIG. 10, one aluminum beam 108 is treated by the hybrid constrained layer (coversheet with 60% PZT and 40% aluminum oxide). The second beam, with the same material and dimensions as the first one, is treated by an active constrained layer with a pure PZT coversheet. The treatments are of the same overall size and at the same location of the beams. Detailed parameters are listed in the following table.

| | Number | Dimension (mm) | Material |
|---|---|---|---|
| Host Beam | 2 | 150 × 20 × 3.3 | Aluminum |
| Viscoelastic Layer | 2 | 100 × 20 × 0.5 | DYAD606 |
| Pure active constraining Layer | 1 | 100 × 20 × 0.5 | PZT 850 |
| Active constraining part of HCL | 1 | 60 × 20 × 0.5 | PZT 850 |
| Passive constraining part of HCL | 1 | 40 × 20 × 0.5 | $Al_2O_3$ |
| Anchor | 2 | | Steel |
| Tip Mass | 2 | 0.2 Kg | Copper |

The self-sensing control law is implemented using the bridge circuit proposed by Dosch, J. J., Inman, D. J. and Garcia, E., 1992, "A Self-Sensing Piezoelectric Actuator for Collocated Control," *Journal of Intelligent Systems and Structures*, Vol.3, pp. 166–185. Capacitors and dummy PZTs (Anderson and Hagood, 1994) are used to balance the bridge. The capacitance of the pure PZT constraining layer is about 44.2 nF. The capacitance of the PZT part of the hybrid constraining layer is about 28 nF. The resistors used in the bridge are 1053 Ω(1%). The differential amplifier 116 is built from the OP470 operational amplifiers. The 790 series power amplifiers 110, 128 from PCB Piezotronics, Inc. are used in the test. The HP35670A spectrum analyzer 130 is used for signal processing. A fiber optical displacement sensor 126 (Philtec Incorporation) is located at the end of the treatment 10 to measure the beam transverse vibration. The PZT patch attached to the bottom of the test beam is used as an exciter 122 to excite the structure. A four-pole Butterworth dual electronic filter 112 from DL Instruments (Model 4302) is used as the low pass filter with a cutoff frequency of 80 Hz (the first resonant frequency of the system is about 30 Hz).

Figure 11:
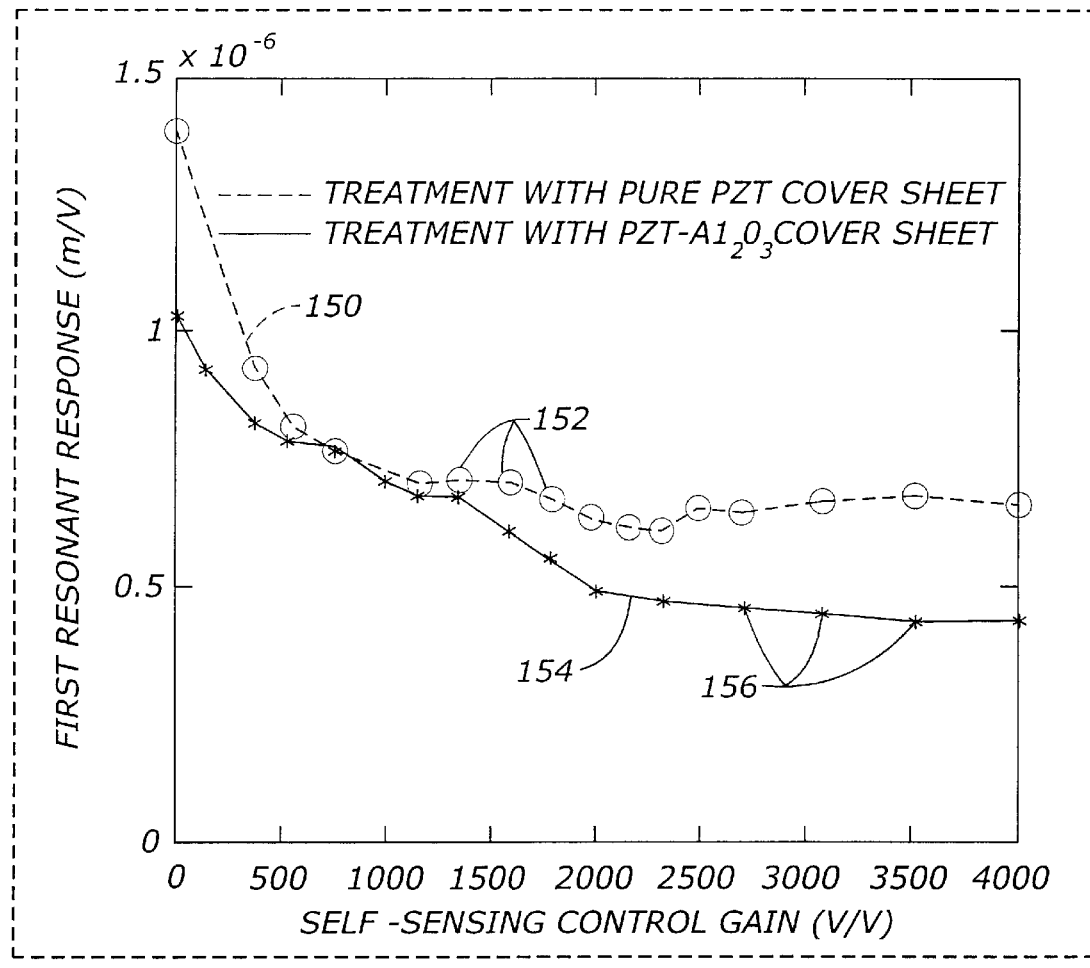
FIG. 11 is a graph of the affect of self-sensing control gain on the first model peek response of the systems.

In FIG. 11, the first resonant responses of the two systems are plotted with respect to the self-sensing control gain. Data points 152 and plot line 150 correspond to treatment with a pure PZT cover sheet and data points 156 and plot line 154 correspond to treatment with a PZT-$Al_2O_3$ cover sheet. The frequency response functions of the systems with different control gains are measured, and the response amplitudes at the first resonant frequencies are used to generate the plot. The input to the system is the voltage applied to the PZT exciter and the output is the beam displacement measured by the optical sensor. It can be seen from FIG. 11 that each system has an optimal control gain. The system with the pure PZT coversheet has an optimal control gain at about 2500 and the system with the hybrid coversheet has an optimal control gain at about 4000. The results shown in FIG. 11 verify that the treatment with an active-passive hybrid constraining layer can outperform the treatment with a purely active constraining layer, both in terms of their open-loop and closed-loop performances. Each with their optimal gains, the closed-loop response of the system with the hybrid coversheet is lower than that of the system with the pure PZT coversheet, as illustrated in FIG. 11. On the other hand, comparing the open-loop responses (control gain is zero), the system with the hybrid coversheet has a peak value of $1.0 \times 10^{-6}$ m/V, and the system with the pure PZT coversheet has a peak value of $1.4 \times 10^{-6}$ m/V. That is, the treatment with the active-passive hybrid constraining layer also has better fail-safe (open-loop) property than the treatment with the purely active coversheet. These observations are consistent with the analytical results.

Figure 12:
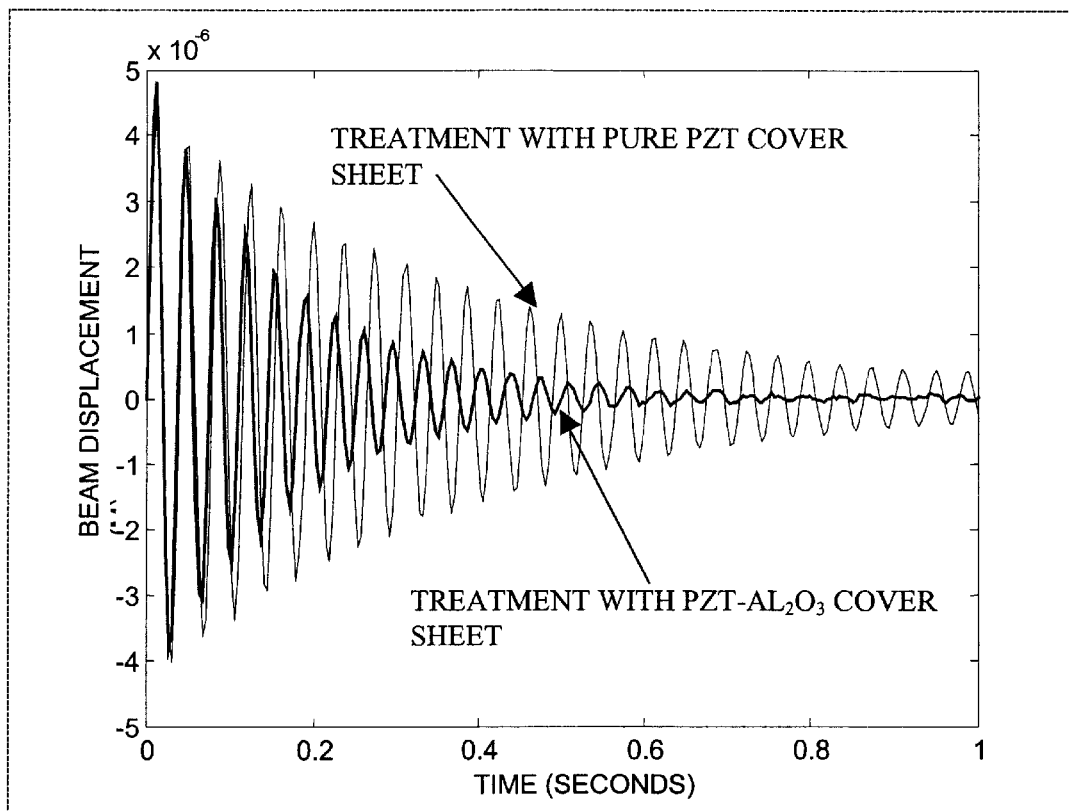
FIG. 12 is a graph of impulse responses of the open-loop systems.
Figure 13:
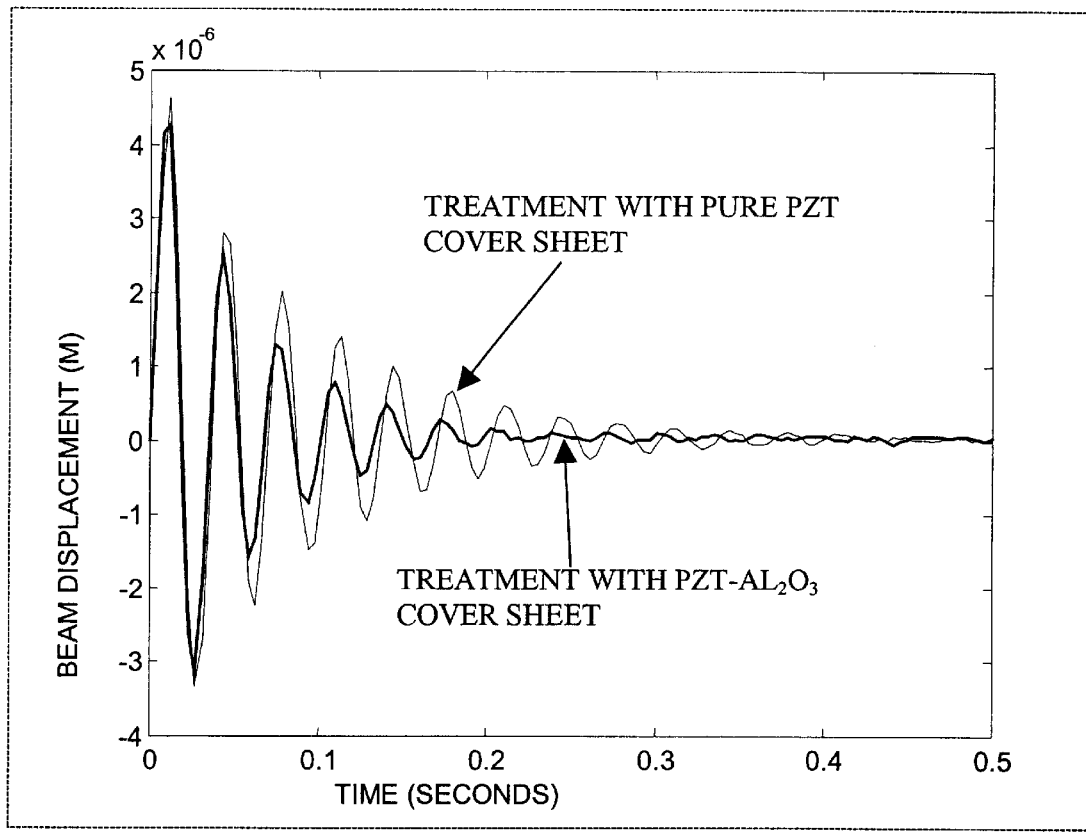
FIG. 13 is a graph of impulse responses of the closed-loop systems.

The same conclusion can also be drawn from the impulse responses of the two systems. In this case, the same electric impulse is generated from the signal analyzer as inputs to the power amplifiers connected to the PZT exciters. The time responses of the beams are measured at the optical sensor location. FIG. 12 shows the impulse responses of the open-loop systems. The damping ratios (derived using the logarithmic decrement method [Inman, D. J., 1994, *Engineering Vibration*, Prentice Hall]) for the treatment with the hybrid coversheet 160 and that with the PZT coversheet 162 are 1.5% and 3.4%, respectively. FIG. 13 shows the impulse responses of the closed-loop systems. The damping ratios are 5.6% for the pure active constraining layer 166 and 8.3% for the HCL 164.

Note that the experimental condition here is not exactly the same as that in the analytical model. The input to the system is force (voltage to the PZT exciters) instead of the strain field of the host structure. Nevertheless, the test results still match the trend observed in the analysis.

The present invention has been further tested in still other embodiments. The present invention contemplates numerous other designs, as may be apparent for a particular environment, application or use. For example, the present invention contemplates that multiple sections of active material or passive material may be used in the HCL. Further, it should be apparent that the host structure need not have a uniform strain distribution within the section treated by HCL and may be of various mode shapes.

If The effects of multiple active/passive sections in the constraining layer have been further examined. Although the present invention contemplates any number of sections, a mathematical model for a three-section constraining layer is used. One skilled in the art will appreciate that this model may be naturally extended to other numbers of sections, other shapes of sections, other configurations of sections, and other placements of sections. Each section can be made of either active or passive materials. In this embodiment, we will focus on four cases where there are three separate sections and where the active material is located at (1) the left section, (2) the right section, (3) the center section, and (4) the two-end sections. To consider the effect of various strain fields in the host structure, the first three modes of a simply supported beam (which consist of both symmetric and anti-symmetric mode shapes) treated by the multi-section HCL are examined. The effects of the in-phase and out-of-phase strain fields on the HCL damping performance can thus be clearly demonstrated using this model and these modes.

Figure 14:
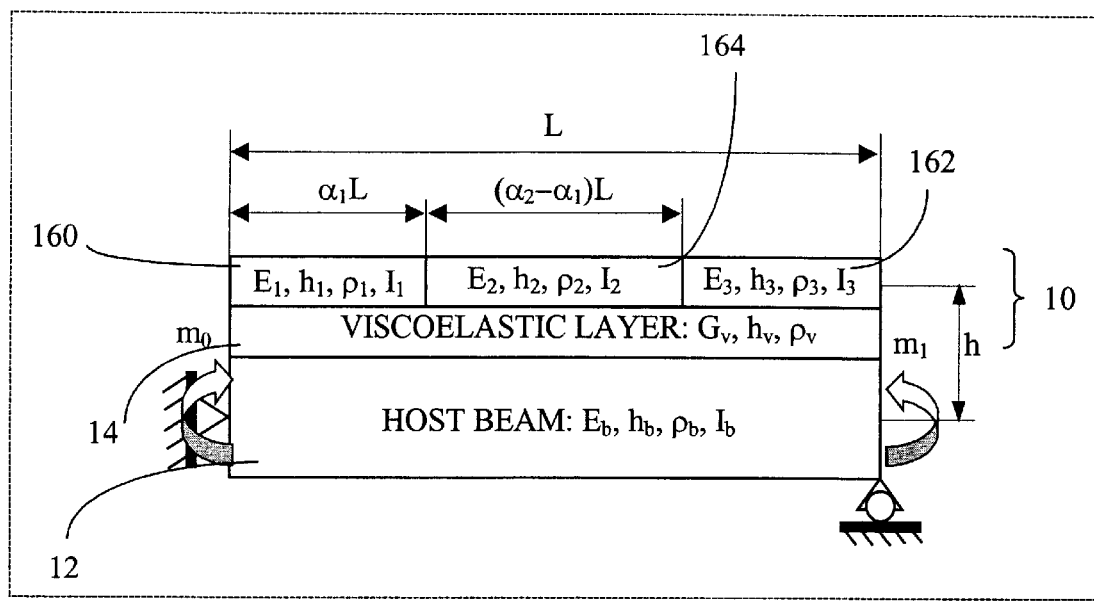
FIG. 14 is diagram of a simply supported beam with fully covered HCL with three sections.

The closed form transfer function matrix of the system to external inputs is derived in this section. To simplify the mathematics, the hybrid constraining layer is assumed to consist of only three sections as shown in FIG. 14. Although only three sections are shown, the present invention contemplates numerous numbers of sections and shapes of sections. FIG. 14 shows a left section 160, a center section 164, and a right section 162. Each section is modeled as an active material with its unique properties and control gain. When zero control gain is applied and passive material properties are set for a specific section, it essentially becomes a passive segment.

Going through the same procedure, the equations of motion in Laplace domain for the system shown in FIG. 14 can be written as $$-\rho_i h_i s^2 u_i + E_i h_i \frac{\partial^2 u_i}{\partial x^2} - \frac{G_v(s)}{h_v}\left(u_i - u_{bi} + h\frac{\partial w_i}{\partial x}\right) = 0, \quad (48)$$

$$\alpha_{i-1}L < x < \alpha_i L$$

-continued $$-\rho_b h_b s^2 u_{bi} + E_b h_b \frac{\partial^2 u_{bi}}{\partial x^2} + \frac{G_v(s)}{h_v}\left(u_i - u_{bi} + h\frac{\partial w_i}{\partial x}\right) = 0, \quad (49)$$

$$\alpha_{i-1}L < x < \alpha_i L$$

$$-(\rho h)_i s^2 w_i - \frac{(EI)_i}{b}\frac{\partial^4 w_i}{\partial x^4} + h\frac{G_v(s)}{h_v}\left(\frac{\partial u_i}{\partial x} - \frac{\partial u_{bi}}{\partial x} + h\frac{\partial^2 w_i}{\partial x^2}\right) = 0, \quad (50)$$

$$\alpha_{i-1}L < x < \alpha_i L$$

with $$(\rho h)_i = \rho_i h_i + \rho_b h_b + \rho_v h_v \quad (51)$$

$$(EI)_i = E_i I_i + E_b I_b \quad (52)$$

where i=1, 2 and 3 indicate the three sections of the beam, and $\alpha_0=0$ and $\alpha_3=1$, $u_i$, $u_{bi}$ and $w_i$ are the longitudinal displacement of the cover sheet, the longitudinal displacement of the host beam and the transverse displacement of the composite beam in the $i^{th}$ section, respectively. E, $G_v$, I, and $\rho$ are the Young's modulus, VEM shear modulus (in s domain), bending stiffness and density of the corresponding materials, respectively, as shown in FIG. 1. b is the width of the beam and L is the length of the beam. The thickness of the different constraining sections is assumed equal ($h_1=h_2=h_3$). Therefore, h is the same for different sections. Other parameters are shown in FIG. 1.

The boundary conditions of the system are $$\frac{\partial u_1}{\partial x} - \Lambda_1 = 0, x = 0 \quad (53)$$

$$U_1=0, x=0 \quad (54)$$

$$W_1=0, x=0 \quad (55)$$

$$(EI)_1\frac{\partial^2 w_1}{\partial x^2} = m_0, x = 0 \quad (56)$$

$$\frac{\partial u_3}{\partial x} - \Lambda_3 = 0, x = L \quad (57)$$

$$\frac{\partial u_{b3}}{\partial x} = 0, x = L \quad (58)$$

$$W_3=0, x= \quad (59)$$

$$(EI)_3\frac{\partial^2 w_3}{\partial x^2} = m_1, x = L \quad (60)$$

Where $m_0$ and $m_1$ are the moments applied at the left and right ends of the beam and $\Lambda_i$ is the free strain of the i-th constraining section (i=1,2,3).

The connecting conditions at $x=\alpha_i L$ (i=1, 2) are $$u_i=u_{i-1}, x=\alpha_i L \quad (61)$$

$$u_{bi}=u_{bi+1}, x=\alpha_i L \quad (62)$$

$$w_i=w_{i+1}, x=\alpha_i L \quad (63)$$

$$\frac{\partial w_i}{\partial x} = \frac{\partial w_{i-1}}{\partial x}, x = \alpha_i L \quad (64)$$

$$E_i h_i\left(\frac{\partial u_i}{\partial x} - \Lambda_i\right) = E_{i+1} h_{i+1}\left(\frac{\partial u_{i+1}}{\partial x} - \Lambda_{i+1}\right), x = \alpha_i L \quad (65)$$

$$\frac{\partial u_{bi}}{\partial x} = \frac{\partial u_{bi+1}}{\partial x}, x = \alpha_i L \quad (66)$$

$$(EI)_i\frac{\partial^2 w_i}{\partial x^2} = (EI)_{i+1}\frac{\partial^2 w_{i+1}}{\partial x^2}, x = \alpha_i L \quad (67)$$

$$(EI)_i\frac{\partial^3 w_i}{\partial x^3} = (EI)_{i+1}\frac{\partial^3 w_{i+1}}{\partial x^3}, x = \alpha_i L \quad (68)$$

Note that the Equations 61–64 are essentially displacement continuity and Equation 65–68 are force continuity at the connecting points.

Define $$D(x,s) = \left\{\begin{array}{c} w_i \\ \frac{\partial w_i}{\partial x} \\ u_i \\ u_{bi} \end{array}\right\}, Q_i(x,s) = \left\{\begin{array}{c} \frac{\partial^2 w_i}{\partial x^2} \\ \frac{\partial^3 w_i}{\partial x^3} \\ \frac{\partial u_i}{\partial x} \\ \frac{\partial u_{bi}}{\partial x} \end{array}\right\}, \quad (69)$$

$$y_i(x,s) = \left\{\begin{array}{c} D(x,s) \\ Q_i(x,s) \end{array}\right\}, i = 1, 2, 3$$

The homogenous equations of motion 48–51 can be written as $$\frac{\partial y_i}{\partial x} = F_i(s) y_i(x,s), i = 1, 2, 3 \quad (70)$$

where $$F_i(s) = \begin{bmatrix} 0 & 1 & 0 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 1 & 0 & 0 \\ -\frac{bs^2(\rho h)_i}{(EI)_i} & 0 & 0 & 0 & \frac{bh^2 G_v}{(EI)_i h_v} & 0 & \frac{bh G_v}{(EI)_i h_v} & -\frac{bh G_v}{(EI)_i h_v} \\ 0 & \frac{hG_v}{E_i h_i h_v} & \frac{G_v + \rho_i h_i h_v s^2}{E_i h_i h_v} & \frac{-G_v}{E_i h_i h_v} & 0 & 0 & 0 & 0 \\ 0 & \frac{-hG_v}{E_b h_b h_v} & \frac{-G_v}{E_b h_b h_v} & \frac{G_v + \rho_b h_b h_v s^2}{E_b h_b h_v} & 0 & 0 & 0 & 0 \end{bmatrix} \quad (71)$$

Follow the procedure in Yang, B., 1994, "Distributed Transfer Function Analysis of Complex Distributed Parameter Systems," *Journal of Applied Mechanics*, Vol. 61, pp. 84–92, the boundary conditions 53–60 can be written as $$B_1(s)y_1(0,s)=\kappa_1(s)\Lambda_1+\kappa_{m0}(s)m_0 \quad (72)$$

$$B_3(s)y_3(L,s)=\kappa_3(s)\Lambda_3+\kappa_{m1}(s)m_1 \quad (73)$$

where $$B_1(s) = \begin{bmatrix} 0 & 0 & 0 & 0 & 0 & 0 & 1 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 1 & 0 & 0 & 0 \end{bmatrix} \quad (74)$$

$$B_3(s) = \begin{bmatrix} 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 0 & 0 & 0 & 1 & 0 & 0 & 0 \end{bmatrix} \quad (75)$$

$$\kappa_1 = \kappa_3 = [1\ 0\ 0\ 0]^T,\ \kappa_{m0} = \begin{bmatrix} 0 & 0 & 0 & \frac{1}{(EI)_1} \end{bmatrix}^T, \quad (76)$$

$$\kappa_{mI} = \begin{bmatrix} 0 & 0 & 0 & \frac{1}{(EI)_3} \end{bmatrix}^T$$

Define the following matrices $$M_1 = \begin{bmatrix} B_1 \\ 0_{4\times 8} \end{bmatrix},\ N_1 = \begin{bmatrix} 0 & 0 \\ I & 0 \end{bmatrix},\ \gamma_1 = \begin{Bmatrix} \kappa_1 \Lambda_1 + \kappa_{m0} m_0 \\ D(\alpha_1 L) \end{Bmatrix} \quad (77)$$

$$M_2 = \begin{bmatrix} I & 0 \\ 0 & 0 \end{bmatrix},\ N_2 = \begin{bmatrix} 0 & 0 \\ I & 0 \end{bmatrix},\ \gamma_2 = \begin{Bmatrix} D(\alpha_1 L) \\ D(\alpha_2 L) \end{Bmatrix} \quad (78)$$

$$M_3 = \begin{bmatrix} I & 0 \\ 0 & 0 \end{bmatrix},\ N_3 = \begin{bmatrix} 0 \\ B_3(s) \end{bmatrix},\ \gamma_3 = \begin{Bmatrix} D(\alpha_2 L) \\ \kappa_3 \Lambda_3 + \kappa_{mI} m_1 \end{Bmatrix} \quad (79)$$

The pseudo boundary conditions for each section can be written as $$M_i(s)y_i(\alpha_{i-1}L,s)+N_i(s)y_i(\alpha_i L,s)=\gamma_i,\ i=1,2,3 \quad (80)$$

According to Yang, B. and Tan, C. A., 1992, "Transfer Functions of One-Dimensional Distributed Parameter Systems," *Journal of Applied Mechanics*, Vol. 59, pp. 1009–1014, the solutions to the homogenous equations of motion 70 and boundary conditions 80 are $$y_i(x,s) \equiv \begin{Bmatrix} D(x,s) \\ Q_i(x,s) \end{Bmatrix} = H_i(x,s)\gamma_i(s),\ i=1,2,3 \quad (81)$$

where $$H_i(x,s) \equiv \begin{bmatrix} H_{iaa} & H_{iab} \\ H_{iba} & H_{ibb} \end{bmatrix} = e^{F_i(s)x}[M_i(s)e^{F_i\alpha_{i-1}L}+N_i(s)e^{F_i\alpha_i L}]^{-1}, \quad (82)$$

$$i=1,2,3$$

Note that because of Equation 78, the displacement continuity conditions 61–64 have already been satisfied. All we need to do now is to enforce the force continuity conditions. Equations 65–68 can be written into the following matrix form $$S_i Q_i(\alpha_i L,s)-S_{i+1}Q_{i+1}(\alpha_i L,s)=r_i\Lambda_i-r_{i+1}\Lambda_{i+1},\ i=1,2 \quad (83)$$

where $$S_i = \begin{bmatrix} 0 & 0 & \frac{E_i h_i}{E_2 h_2} & 0 \\ 0 & 0 & 0 & 1 \\ \frac{(EI)_i}{(EI)_2} & 0 & 0 & 0 \\ 0 & \frac{(EI)_i}{(EI)_2} & 0 & 0 \end{bmatrix},\ r_i = \begin{Bmatrix} \frac{E_i h_i}{E_2 h_2} \\ 0 \\ 0 \\ 0 \end{Bmatrix},\ i=1,2,3 \quad (84)$$

From Equations 81, we have $$Q_1(\alpha_1 L)=H_{1ba}(\alpha_1 L)(\kappa_1\Lambda_1+\kappa_{m0}M_0)+H_{1bb}(\alpha_1 L)D(\alpha_1 L) \quad (85)$$

$$Q_2(\alpha_1 L)=H_{2ba}(\alpha_1 L)D(\alpha_1 L)+H_{2bb}(\alpha_1 L)D(\alpha_2 L) \quad (86)$$

$$Q_2(\alpha_2 L)=H_{2ba}(\alpha_2 L)D(\alpha_1 L)+H_{2bb}(\alpha_2 L)D(\alpha_2 L) \quad (87)$$

$$Q_3(E_2 L)=H_{3ba}(\alpha_2 L)D(\alpha_2 L)+H_{3bb}(\alpha_2 L)(\kappa_3\Lambda_3+\kappa_{m1}M_1) \quad (88)$$

Substitute Equations 85–88 into 83, the displacements at the connecting points can be written as $$K_{op}\begin{Bmatrix} D(\alpha_1 L) \\ D(\alpha_2 L) \end{Bmatrix} = R_1\Lambda_1 + R_2\Lambda_2 + R_3\Lambda_3 + R_{m0}m_0 + R_{mI}m_1 \quad (89)$$

where $$K_{op} = \begin{bmatrix} S_1 H_{1bb}(\alpha_1 L) - S_2 H_{2ba}(\alpha_1 L) & -S_2 H_{2bb}(\alpha_1 L) \\ S_2 H_{2ba}(\alpha_2 L) & S_2 H_{2bb}(\alpha_2 L) - S_3 H_{3ba}(\alpha_2 L) \end{bmatrix} \quad (90)$$

$$R_1 = \begin{Bmatrix} r_1 - S_1 H_{1ba}(\alpha_1 L)\kappa_1 \\ 0_{4\times 1} \end{Bmatrix},\ R_2 = \begin{Bmatrix} -r_2 \\ r_2 \end{Bmatrix}, \quad (91)$$

$$R_3 = \begin{Bmatrix} 0_{4\times 1} \\ -r_3 + S_3 H_{3bb}(\alpha_2 L)\kappa_3 \end{Bmatrix}$$

$$R_{m0} = \begin{Bmatrix} -S_1 H_{1ba}(\alpha_1 L)\kappa_{m0} \\ 0_{4\times 1} \end{Bmatrix},\ R_{mI} = \begin{Bmatrix} 0_{4\times 1} \\ S_3 H_{3bb}(\alpha_2 L)\kappa_{mI} \end{Bmatrix} \quad (92)$$

For passive constraining materials or the open-loop system, the free strains $\kappa_1$, $\kappa_2$ and $\kappa_3$ will be zero and Equation 89 can be used to solve for $D((\alpha_1 L)$ and $D(\alpha_2 L)$. The system response can then be found from Equation 81.

If any one of the constraining sections is an active material, the free strain $\Lambda_i$ will be related to the control algorithm used. Here, a self-sensing actuation is utilized [Dosch, J. J., Inman, D. J. and Garcia, E., 1992, "A Self-Sensing Piezoelectric Actuator for Collocated Control," *Journal of Intelligent Systems and Structures*, Vol.3, pp. 166–185; Shen, I. Y., 1997, "A Variational Formulation, a Work-Energy Relation and Damping Mechanisms of Active Constrained Layer Treatments," *ASME Journal of Vibration and Acoustics*, Vol.119, pp. 192–199; and Baz, A., 1997, "Optimization of Energy Dissipation Characteristics of Active Constrained Layer Damping," *Smart Materials and Structures*, Vol.6, pp. 360–368] to ensure stability. Each section is controlled with a local control law and the free strain can be expressed as $$\Lambda_i=g_i s[u_i(\alpha_{i-1}L)-u_i(\alpha_i L)]=g_i sT[D(\alpha_{i-1}L)-D(\alpha_i L)],\ i=1,2,3 \quad (93)$$

with $$T=[0\ 0\ 1\ 0] \quad (94)$$

Consider Equation 81, we have $$D(0,s)=H_{1aa}(0)(\kappa_1\Lambda_1+\kappa_{m0}m_0)+H_{1ab}(0)D(\alpha_1L) \quad (95)$$

$$D(L,s)=H_{3aa}(L)D(\alpha_2L)+H_{3ab}(L)(\kappa_3\Lambda_3+\kappa_{m1}m_1) \quad (96)$$

Substitute Equations 95 and 96 into Equation 93, the free strains of the constraining sections can be written as $$\Lambda_1 = C_{m0}m_0 + C_{d1}\begin{Bmatrix} D(\alpha_1L) \\ D(\alpha_2L) \end{Bmatrix}, \quad (97)$$

$$\Lambda_2 = C_{d2}\begin{Bmatrix} D(\alpha_1L) \\ D(\alpha_2L) \end{Bmatrix}, \quad \Lambda_3 = C_{m1}m_1 + C_{d3}\begin{Bmatrix} D(\alpha_1L) \\ D(\alpha_2L) \end{Bmatrix}$$

where $$C_{m0} = \frac{g_1 s T H_{1aa}(0)\kappa_{m0}}{1 - g_1 s T H_{1aa}(0)\kappa_1}, \quad C_{m1} = -\frac{g_3 s T H_{3ab}(L)\kappa_{m1}}{1 + g_3 s T H_{3ab}(L)\kappa_3} \quad (98)$$

$$C_{d1} = -\frac{g_1 s T[H_{1ab}(0) - I][I\ 0]}{1 - g_1 s T H_{1aa}(0)\kappa_1}, \quad C_{d2} = g_2 s T[I\ -I], \quad (99)$$

$$C_{d3} = \frac{g_3 s T[I - H_{3aa}(L)][0\ I]}{1 + g_3 s T H_{3ab}(L)\kappa_3}$$

Substitute Equation 97 into Equation 89, the displacements at the connecting points in the closed-loop system can be derived as $$K_{cl}\begin{Bmatrix} D(\alpha_1L) \\ D(\alpha_2L) \end{Bmatrix} = [R_{m0} + R_1 C_{m0}]m_0 + [R_{m1} + R_3 C_{m1}]m_1 \quad (100)$$

where $$K_{cl}=K_{op}-R_1C_{d1}-R_2C_{d2}-R_3C_{d3} \quad (101)$$

The displacements at anywhere else can then be found from Equations 95, 96 and 81.

Equation 100 represents the transfer function matrix between the input moments and the displacement outputs at the connecting points. Theoretically, it can be used to study the stability of the hybrid damping system as Shen, I. Y., 1996, "Stability and Controllability of Euler-Bernoulli Beams with Intelligent Constrained Layer Treatments," *ASME Journal of Vibration and Acoustics*, Vol. 118, p. 70–77, did for the ACL treatment with PID controls. However, to do so, the entire s domain has to be scanned to find eigenvalues of the system, which makes it very computationally intensive. Fortunately, it can be derived (similar to that presented in Shen, I. Y., 1997, "A Variational Formulation, a Work-Energy Relation and Damping Mechanisms of Active Constrained Layer Treatments," *ASME Journal of Vibration and Acoustics*, Vol.119, pp. 192–199) that the self-sensing actuation used here guarantees system stability. The frequency responses (s=jω)) can be easily calculated from the above equations to examine the open and closed loop performance of the HCL system.

Frequency response functions of different HCL configurations are calculated to compare their open-loop damping performance. It is found that the HCL open-loop damping is not only affected by the active material coverage ratio, but also influenced by the distribution of the active and passive materials in the constraining layer. Including more of the stiffer passive material in the constraining layer (smaller active material coverage ratio) will increase the open-loop damping of the HCL. For a fixed active material coverage ratio, the best distribution of the active and passive constraining sections is related to the mode shapes of the structure.

In this embodiment, a steel beam (500×30×5 mm) with density of 7850 Kg/m$^3$ and Young's Modulus of 2×10$^{11}$ N/m$^2$ fully treated by the HCL is examined. The active constraining material is piezoceramics with density of 7500 Kg/m$^3$ and Young's Modulus of 4.9×10$^{10}$ N/m$^2$. The passive constraining material is steel. The thickness of the constraining layer is 1 mm. The viscoelastic material is 3M ISD112 with thickness of 2 mm. The input to the system is a unit moment applied at left end ($m_0$=1, $m_1$=0) and the slope of the beam at the right end is calculated as the structural response (output measurement) to investigate the system performance. As will be seen in the analysis results shown later, the system modal frequencies will only change very slightly as the configuration and parameters are varied in the studies. Therefore, we will use the modal response amplitude as an indicator of the treatments' damping ability. That is, smaller response implies higher damping and better vibration suppression performance.

Figure 15A:
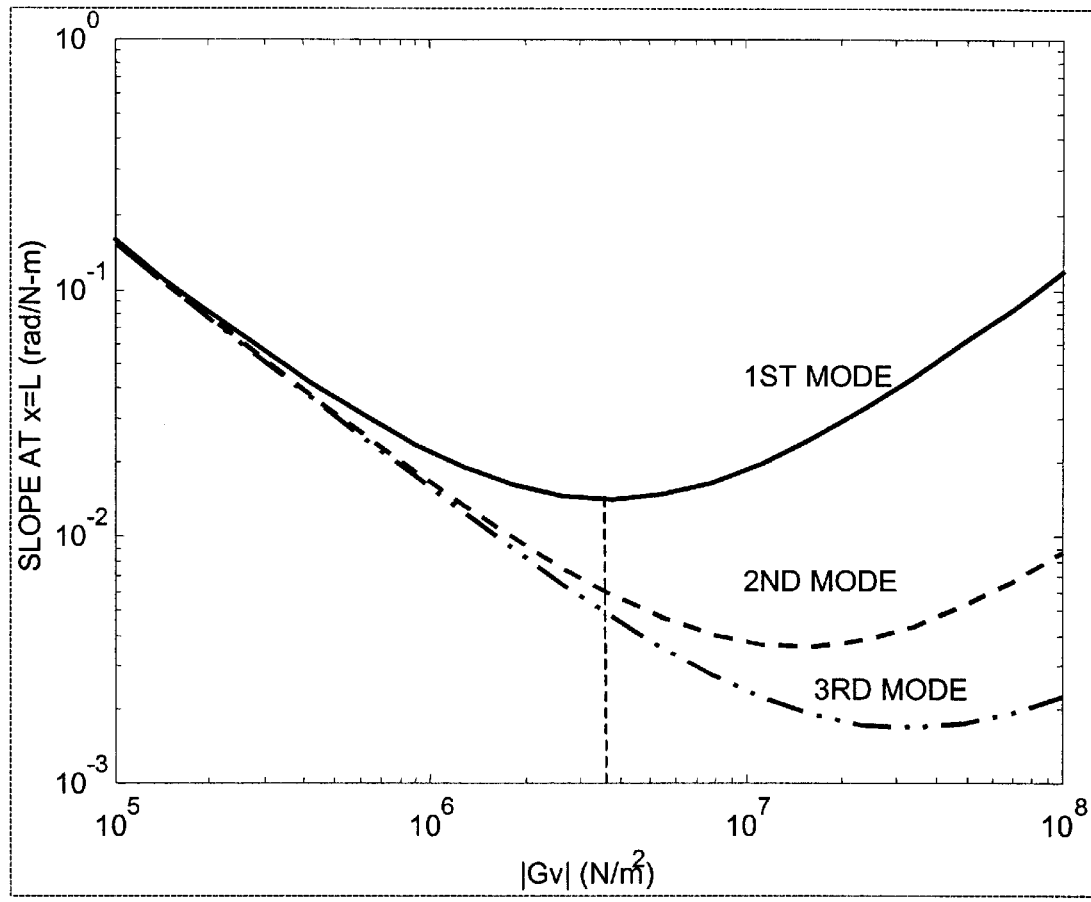
FIG. 15A is a graph of the resonant responses versus magnitude of VEM shear modulus $|G_v|$.
Figure 15B:
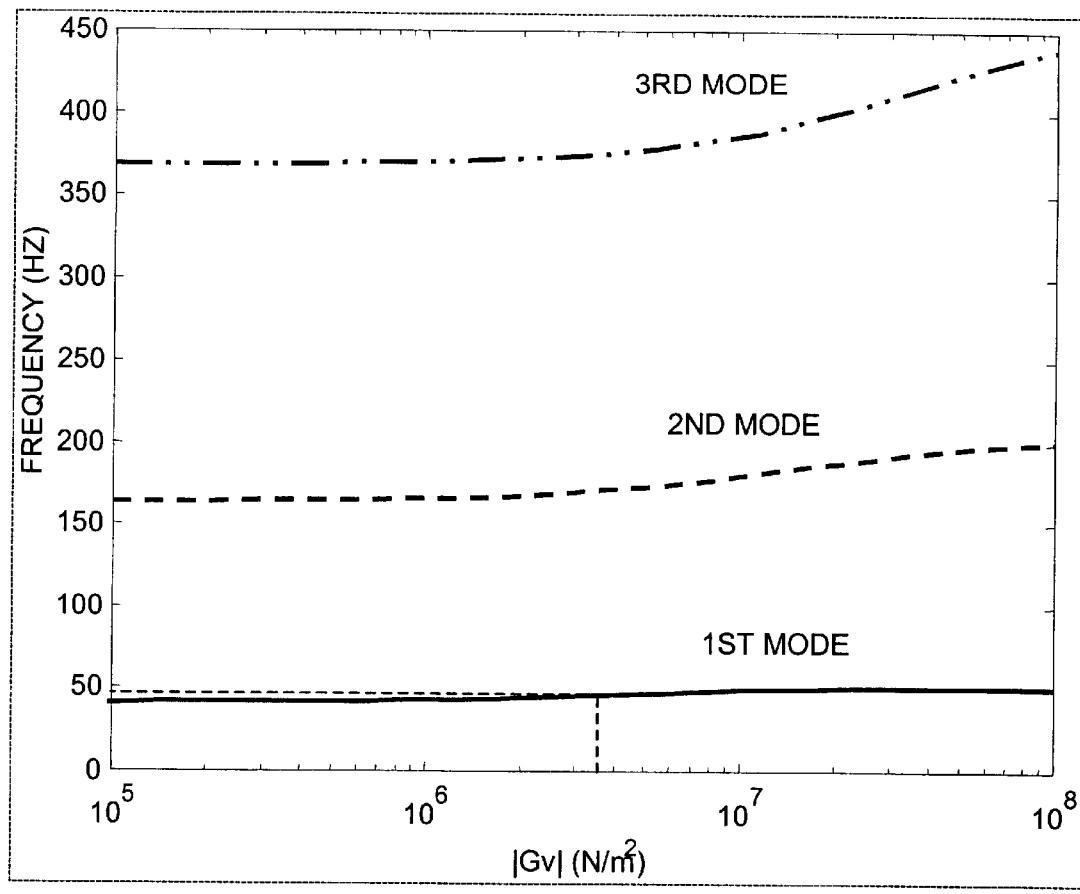
FIG. 15B is a graph of resonant frequencies versus magnitude of VEM shear modulus $|G_v|$.

The characteristic length of the treatment has significant effects on the open-loop damping performance. When the thickness and length of the constraining layer and viscoelastic layer are pre-described and the constraining material pre-selected, the viscoelastic material property (storage modulus and loss factor) will determine the characteristic length. In FIG. 15, the first three open-loop resonant responses of the ACL treated beam and the corresponding frequencies are plotted versus the magnitude ($|G_v|$) of the viscoelastic material shear modulus (the loss factor is assume to be 1.0). It can be observed from the figure that there is an optimal shear modulus magnitude for each mode. For example, the optimal value for the first mode in this example is about 3.5×10$^6$ N/m$^2$. Since the optimal magnitude of the VEM shear modulus increases with the increase of mode number, the VEM can generally be optimally selected for only one vibration mode.

Figure 16A:
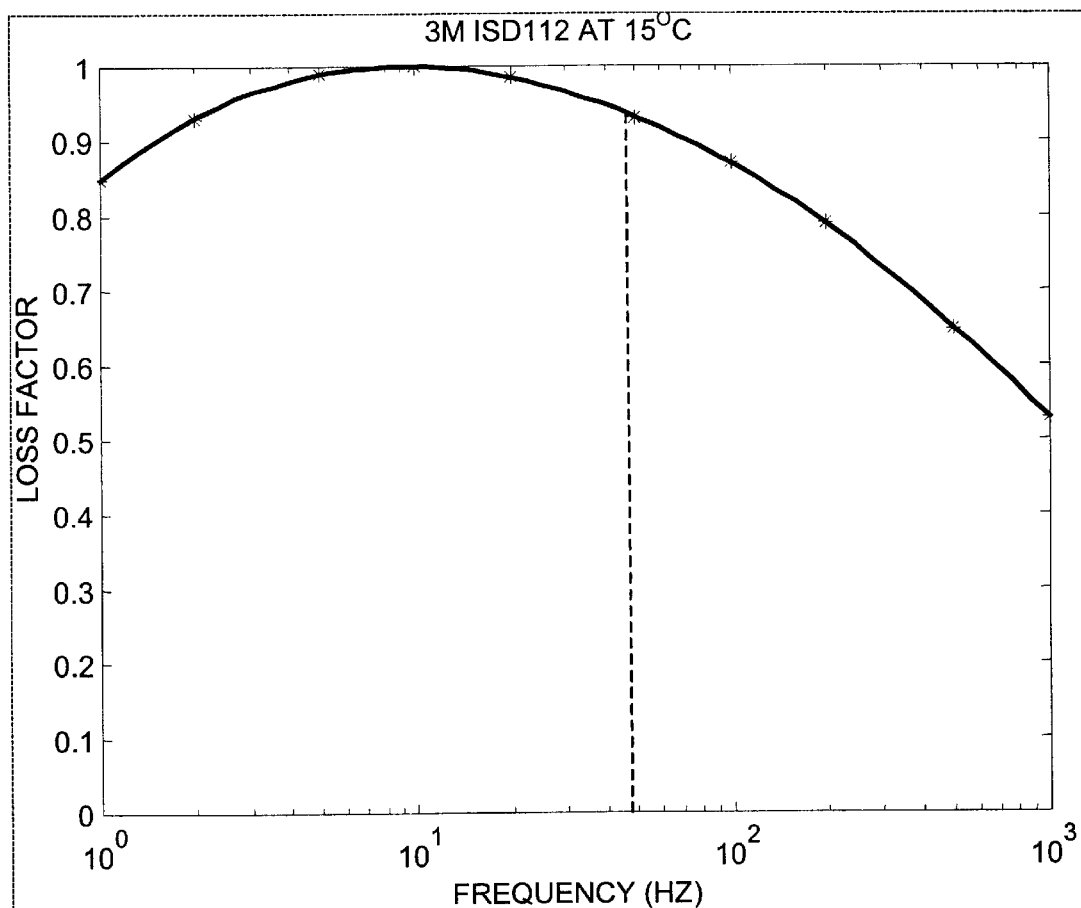
FIG. 16A is a graph of loss factor of 3M ISD112.
Figure 16B:
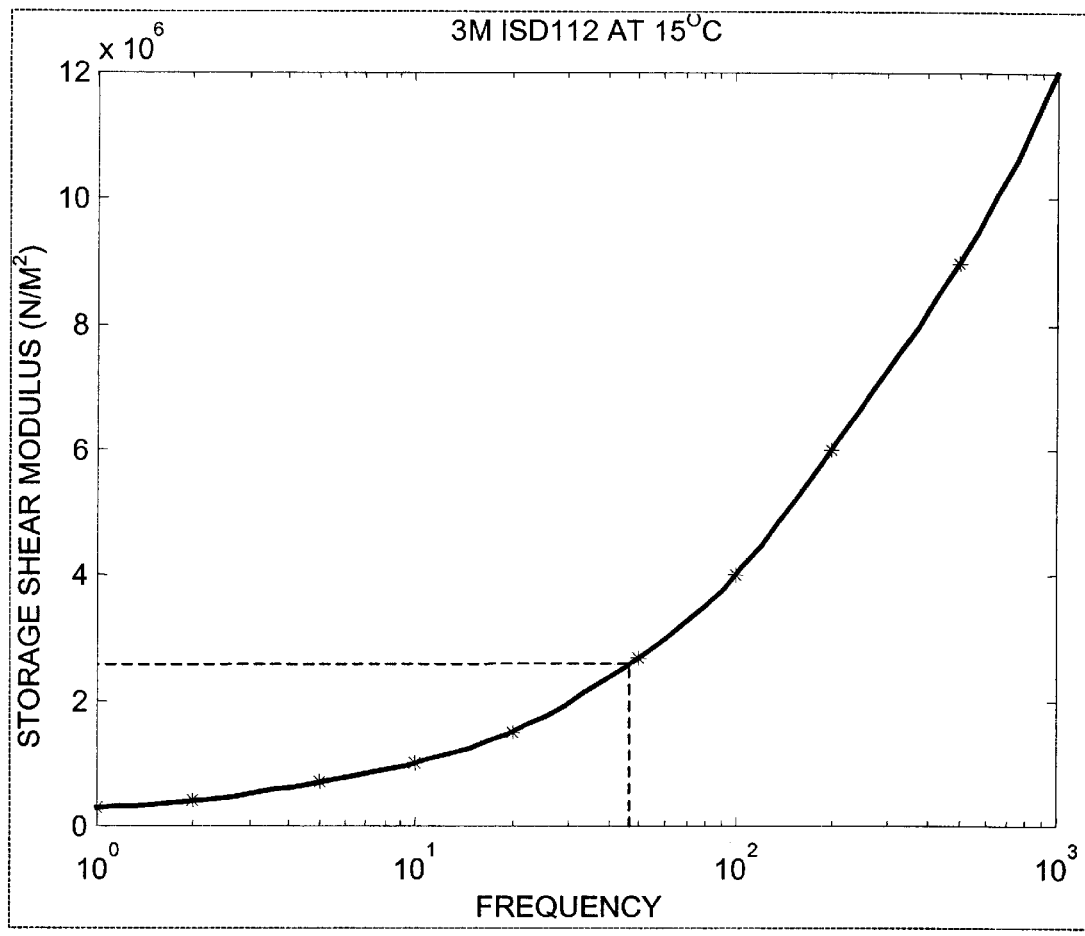
FIG. 16B is a graph of storage modulus of 3M ISD112.

In this study, we will select a baseline treatment that has the best fail-safe performance in the first mode (lowest first modal response) of the open-loop ACL system. The property of the 3M ISD112 at 15° C. is shown in FIG. 16. At 46 Hz, which is the first resonant frequency shown in FIG. 15, the material loss factor is close to 1.0 and the storage modulus is about 2.5×10$^6$ N/m$^2$. This will give us a shear modulus magnitude of 3.5×106 N/m$^2$, which is the optimal VEM shear modulus magnitude to achieve the lowest response at the first resonant frequency (see FIG. 15). Therefore, a treatment with this material is selected as the baseline case here.

Figure 17:
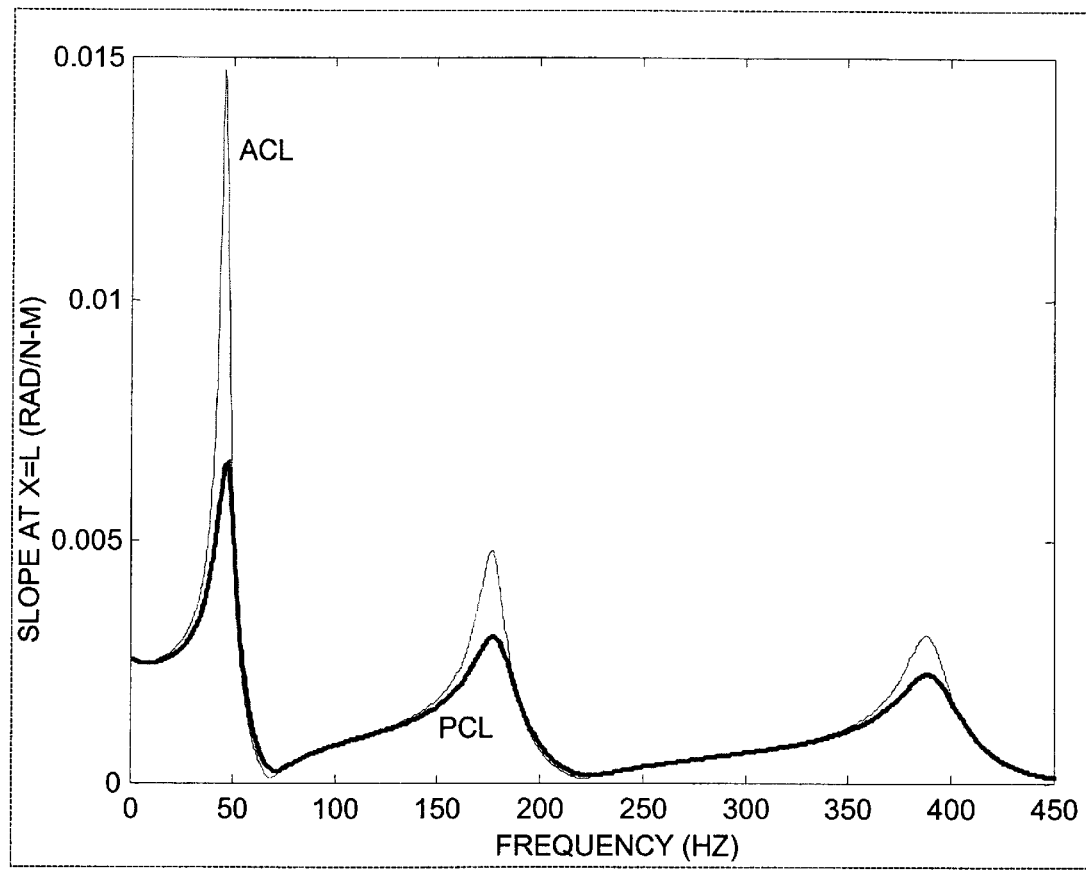
FIG. 17 is a a graph of frequency responses of open-loop ACL and PCL.

The frequency response of the baseline open-loop ACL beam and that of the PCL treated beam with a layer of steel as the constraining layer are shown in FIG. 17. Obviously, steel provides better constraining action than the PZT, which means a hybrid constraining layer can be used to obtain better open-loop damping.

Figure 18A:
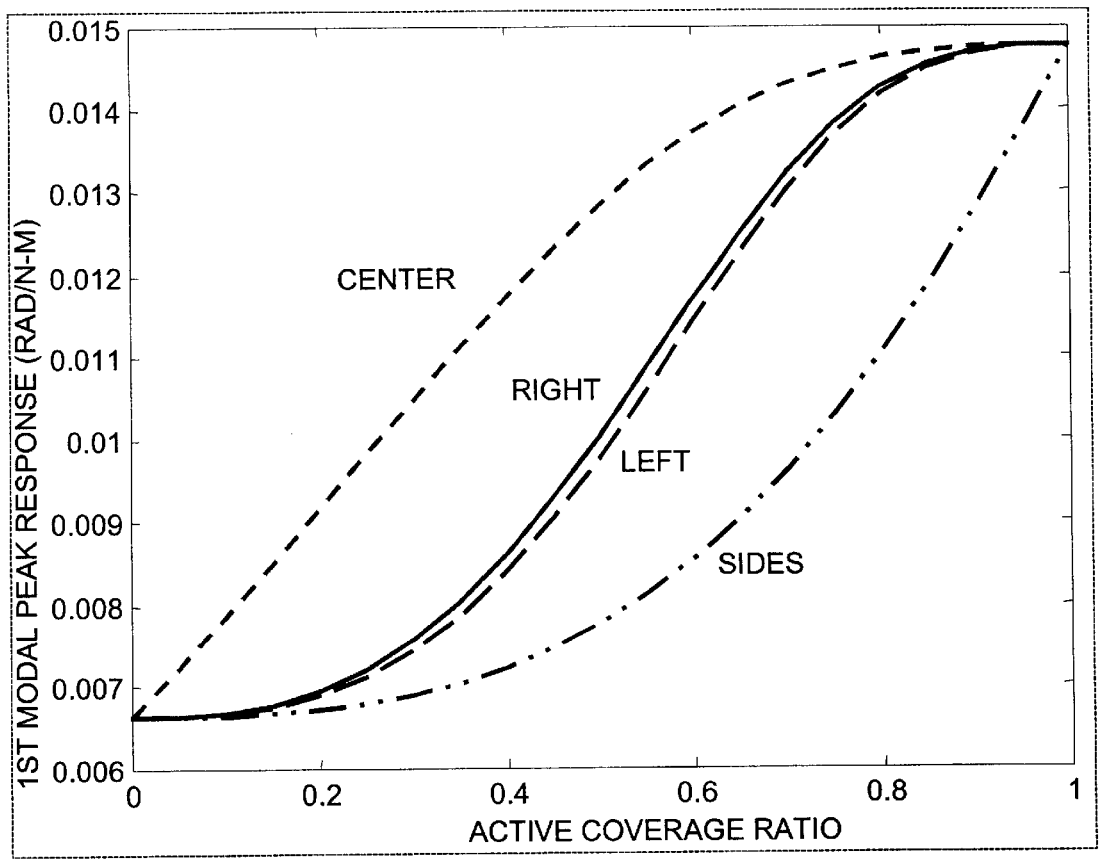
FIG. 18A is a graph of the effect of constraining layer configuration on the first mode of the open-loop system.
Figure 18B:
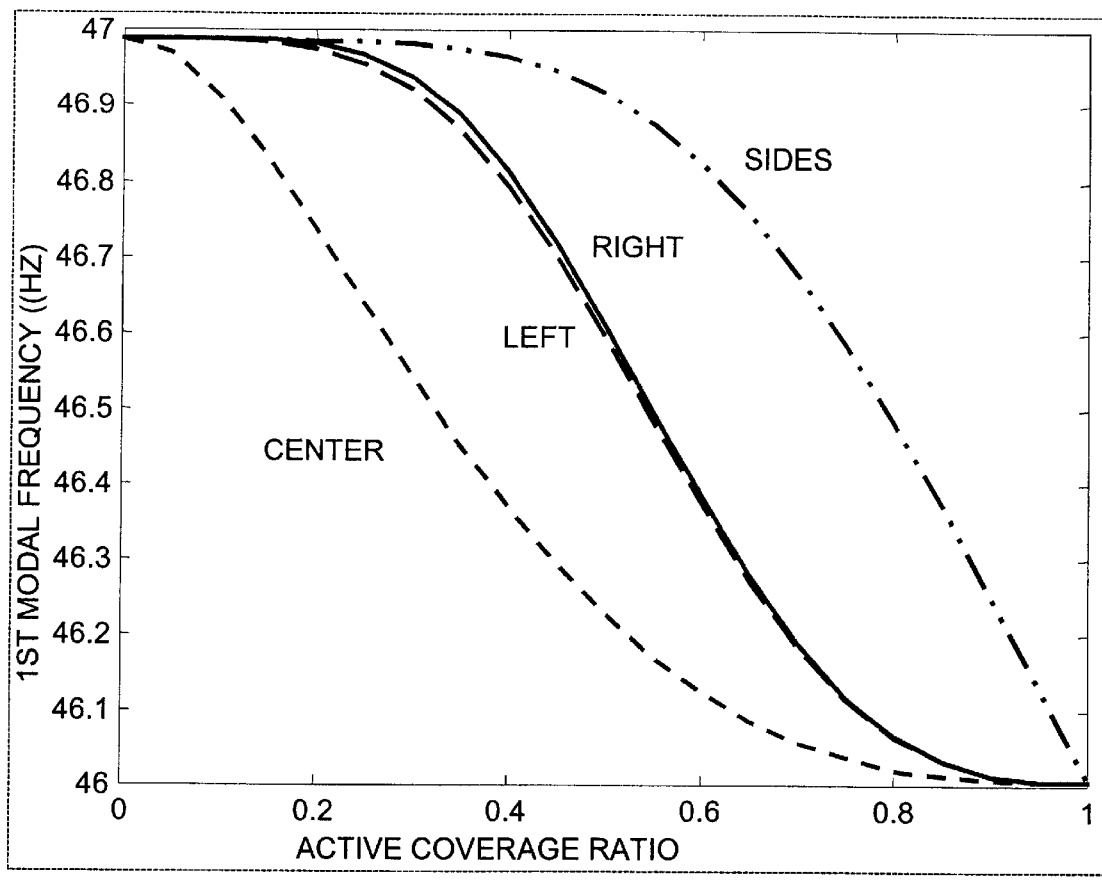
FIG. 18B is also a graph of the effect of constraining layer configuration on the first mode of the open-loop system.

FIG. 18 illustrates the effects of the active material coverage ratio on the first resonant response of the system and the corresponding frequency for four different distributions of the active and passive materials in the constraining layer. "Right" and "left" in FIG. 18 denote the location of the active section in a two-section constraining layer. This is similar to the case discussed previously. "Center" indicates that the active section is the center section of a three-section constraining layer. "Sides" means that the active material locates on the two ends of a three-section constraining layer. FIG. 18 confirms the idea that combining active and passive materials in the constraining layer improves the constraining action of a pure active cover sheet. The more passive material is included in the cover sheet, the higher the open-loop damping. For the same active material coverage ratio, placing the active material on the two ends (the passive material in the center) is more effective in reducing the first resonant response of the system.

Figure 19A:
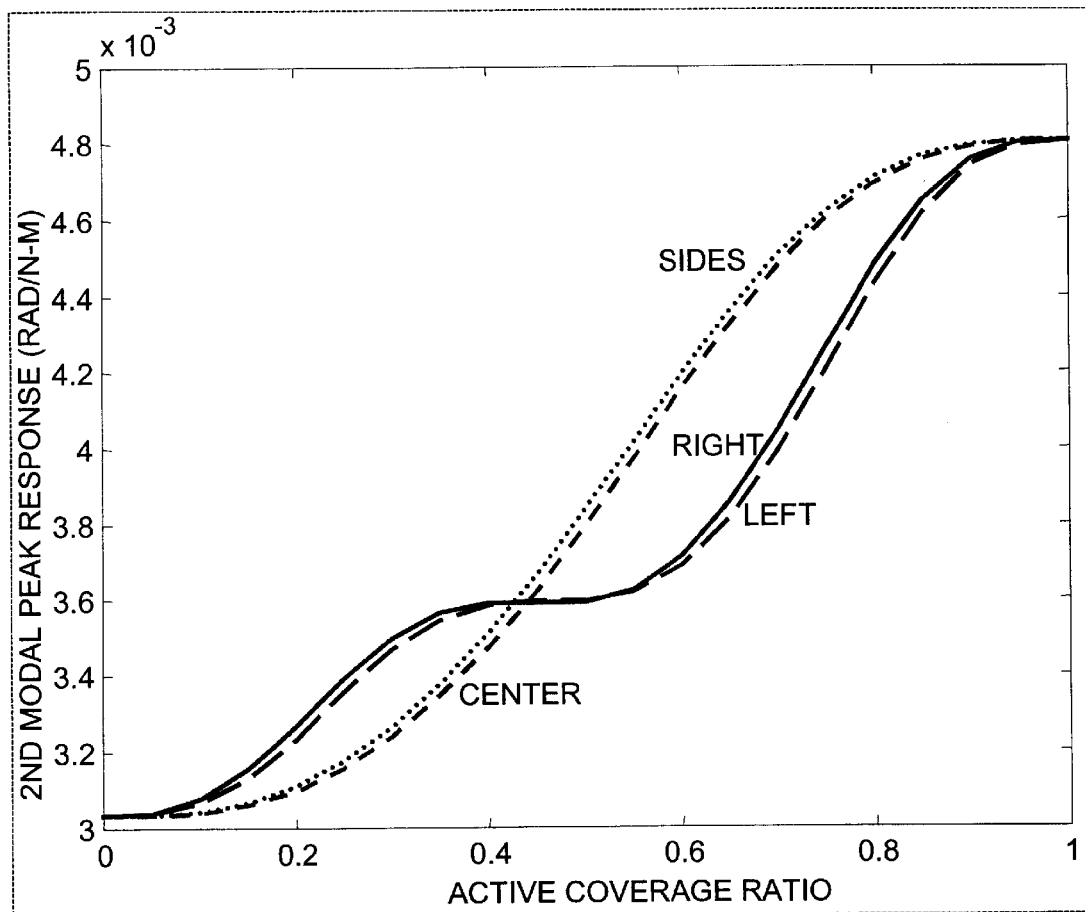
FIG. 19A graph of the effect of constraining layer configuration on the second mode of the open-loop system.
Figure 19B:
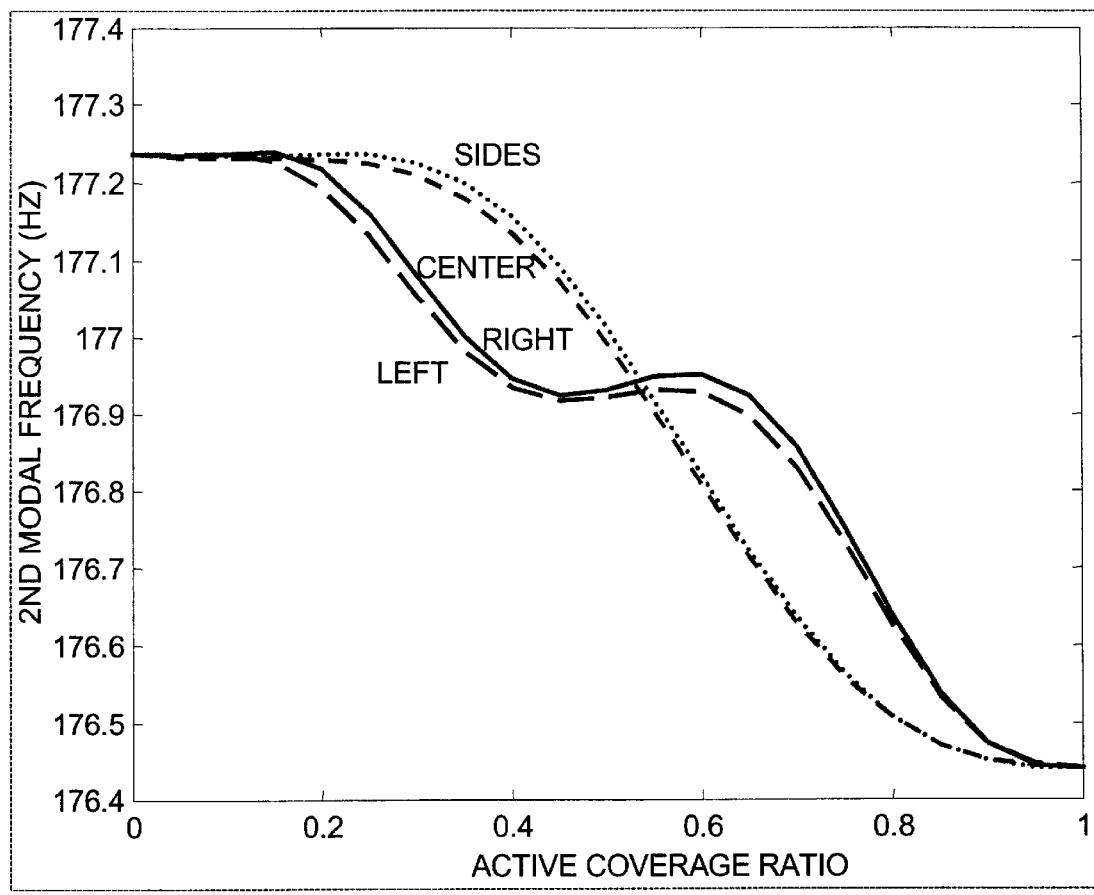
FIG. 19B is also a graph of the effect of constraining layer configuration on the second mode of the open-loop system.

FIG. 19 shows the effects of the active material coverage ratio on the second resonant response of the system and the corresponding frequency for the four distributions of active and passive materials in the constraining layer. Again, the effectiveness of the HCL treatment is related to the active material coverage ratio and the distribution of the active and passive sections. However, different from the first mode case, the best distribution of the active and passive constraining sections for the second mode depends on the value of the active material coverage ratio. Similar phenomenon can be observed for the third mode as shown in FIG. 20.

Figure 20A:
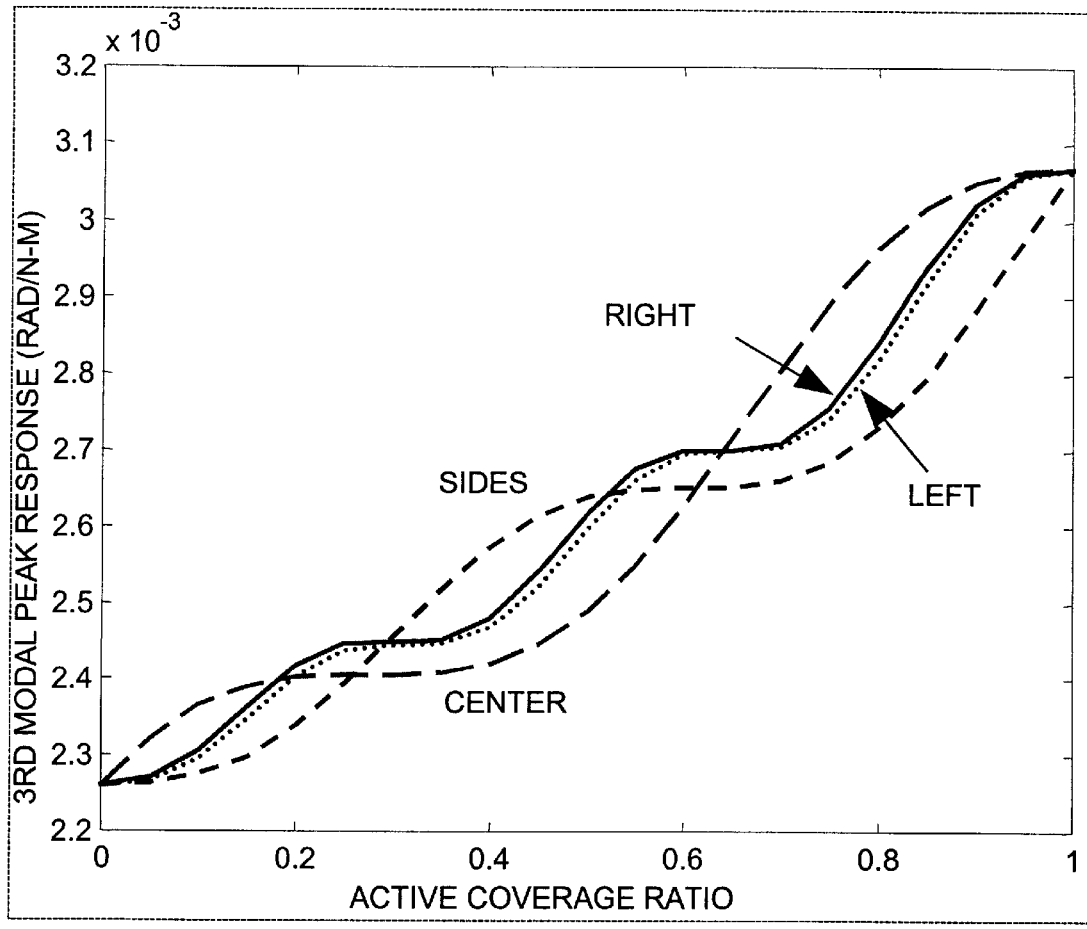
FIG. 20A is a graph of the effect of constraining layer configuration on the third mode of the open-loop system.
Figure 20B:
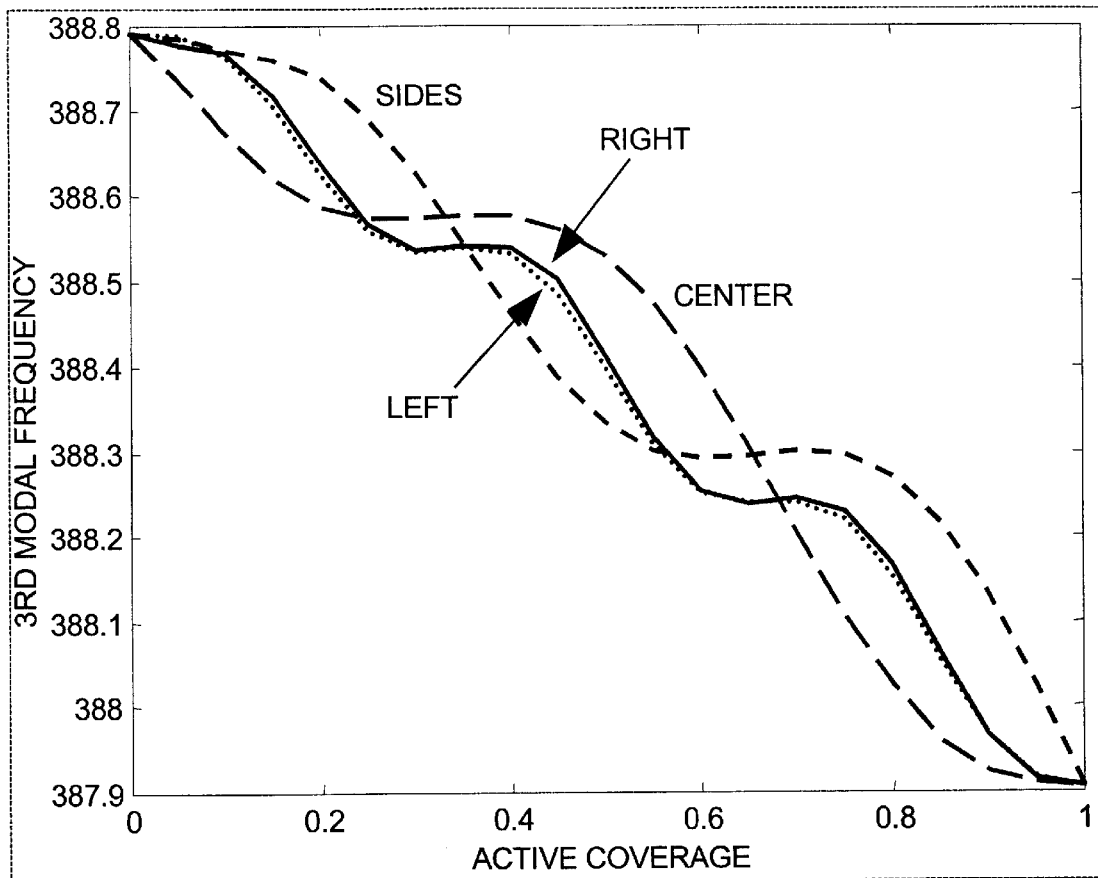
FIG. 20B is also a graph of the effect of constraining layer configuration on the third mode of the open-loop system.

FIG. 18, FIG. 19 and FIG. 20 indicate that, while the active-passive hybrid constraining layer can indeed be used to obtain better constraining action than a purely active constraining layer, the best distribution of the active and passive materials in the constraining layer for a given active material coverage ratio is different for different mode shapes. The targeted mode shape (strain distribution) should be considered when designing the hybrid constraining layer.

Figure 21A:
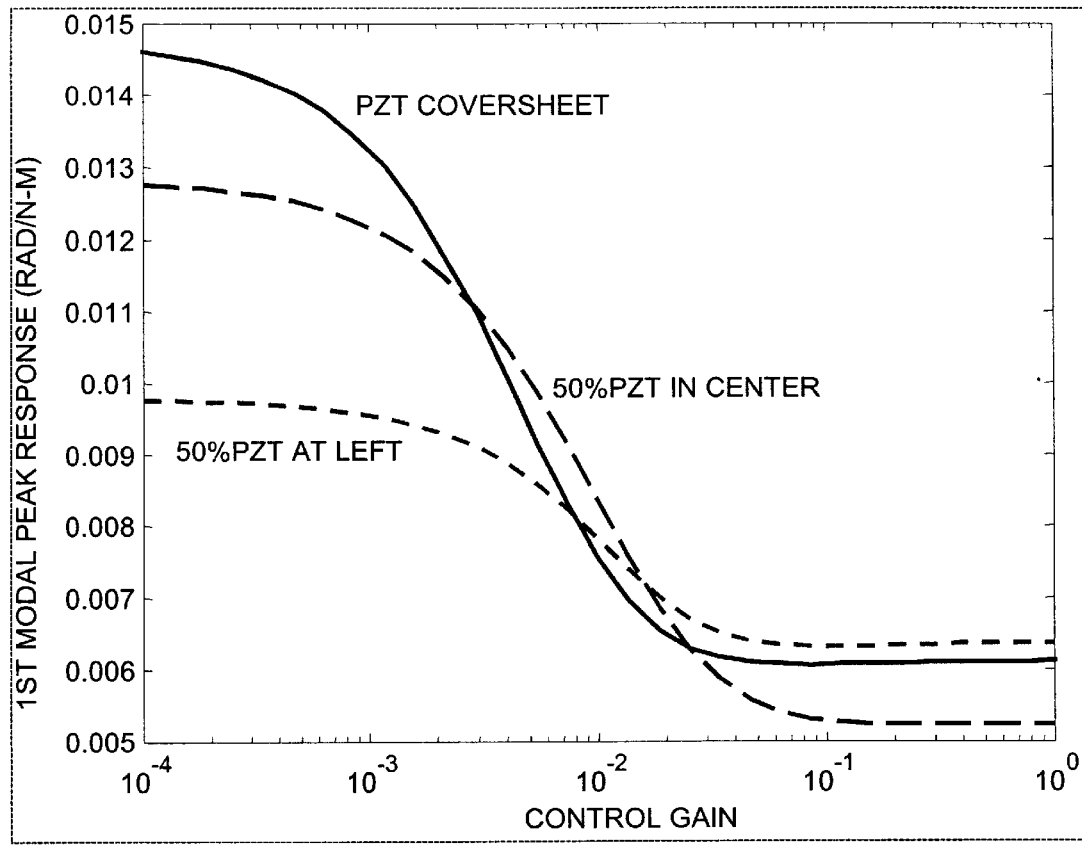
FIG. 21A is a graph showing the first resonant peak response versus control gain.
Figure 21B:
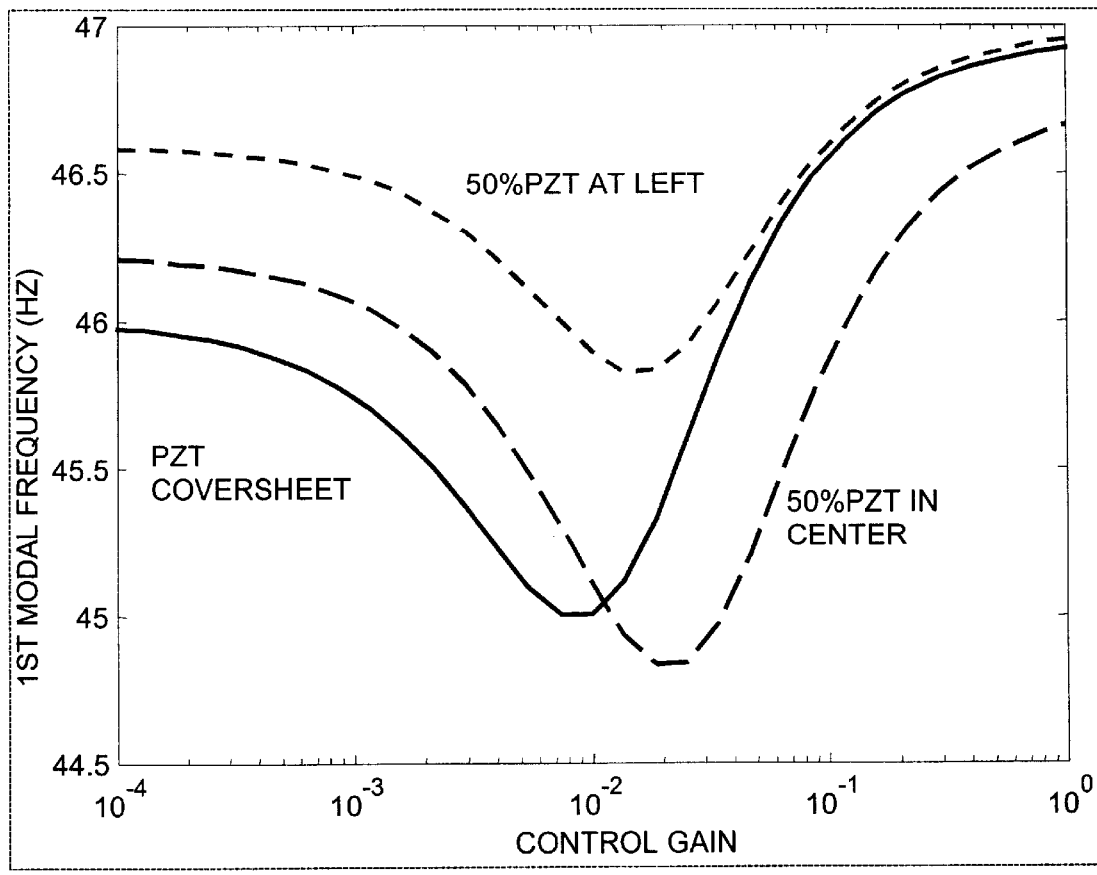
FIG. 21B is a graph showing first modal frequency versus control gain.
Figure 22A:
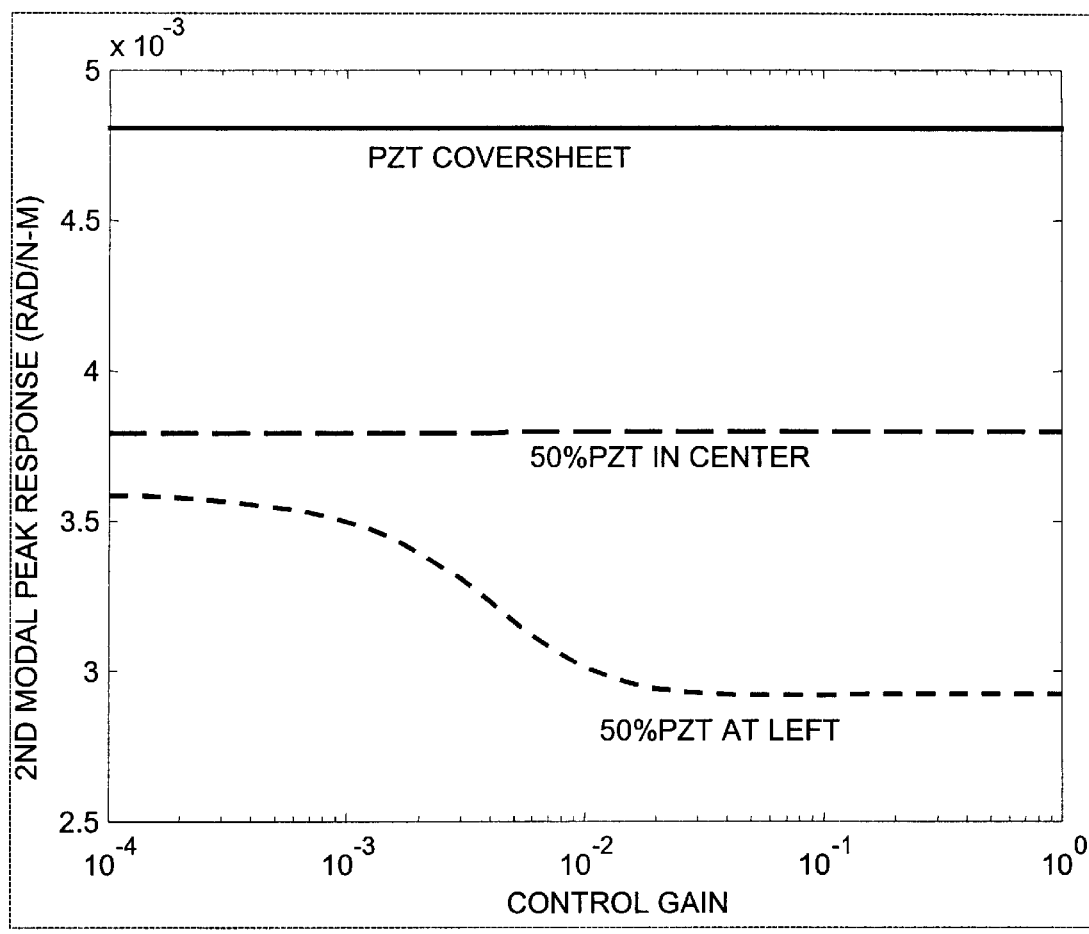
FIG. 22A is a graph showing second modal peak response versus control gain.
Figure 22B:
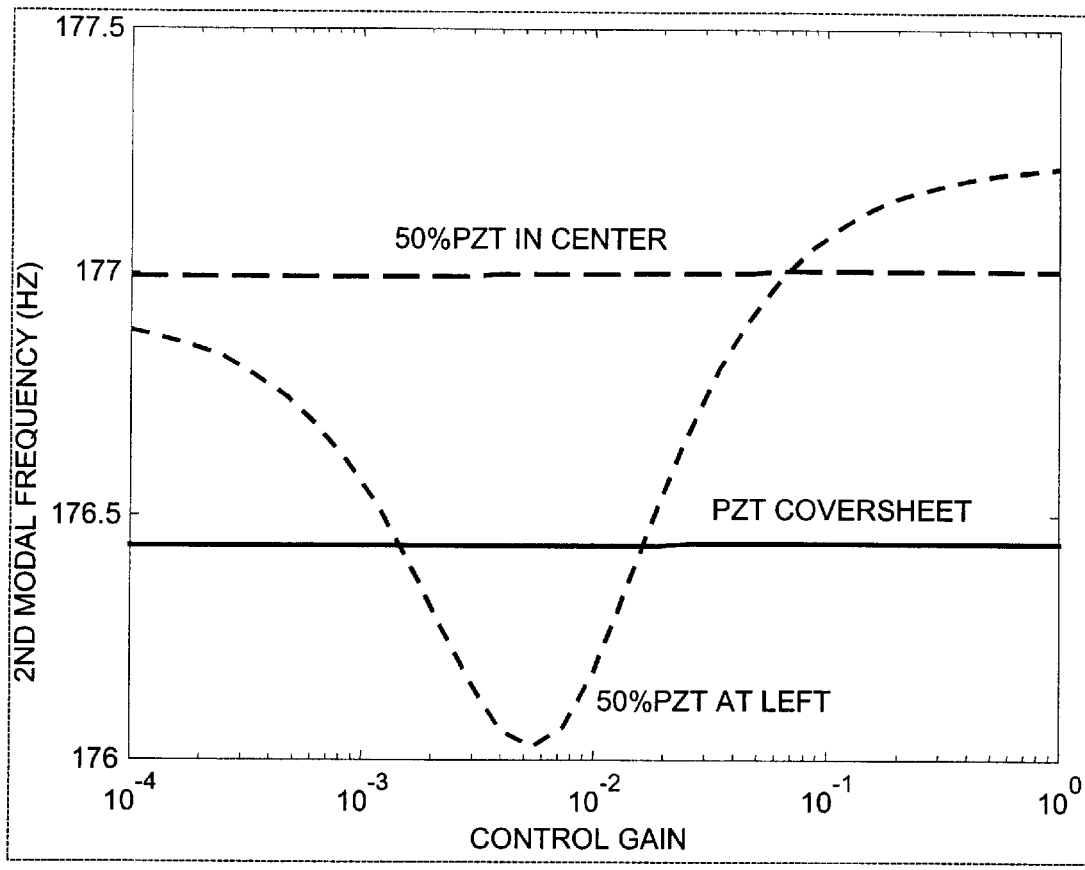
FIG. 22B is a graph showing second modal frequency versus control gain.
Figure 23A:
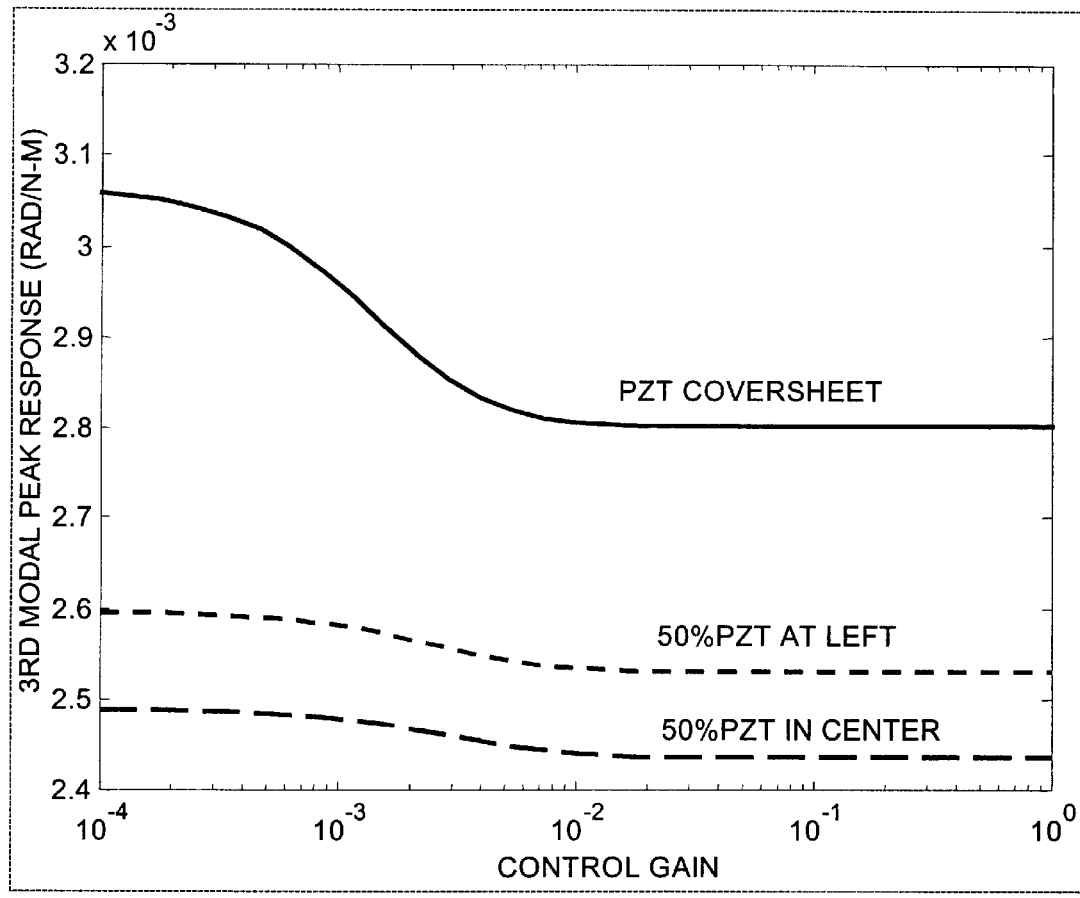
FIG. 23A is a graph showing third modal peak response versus control gain.
Figure 23B:
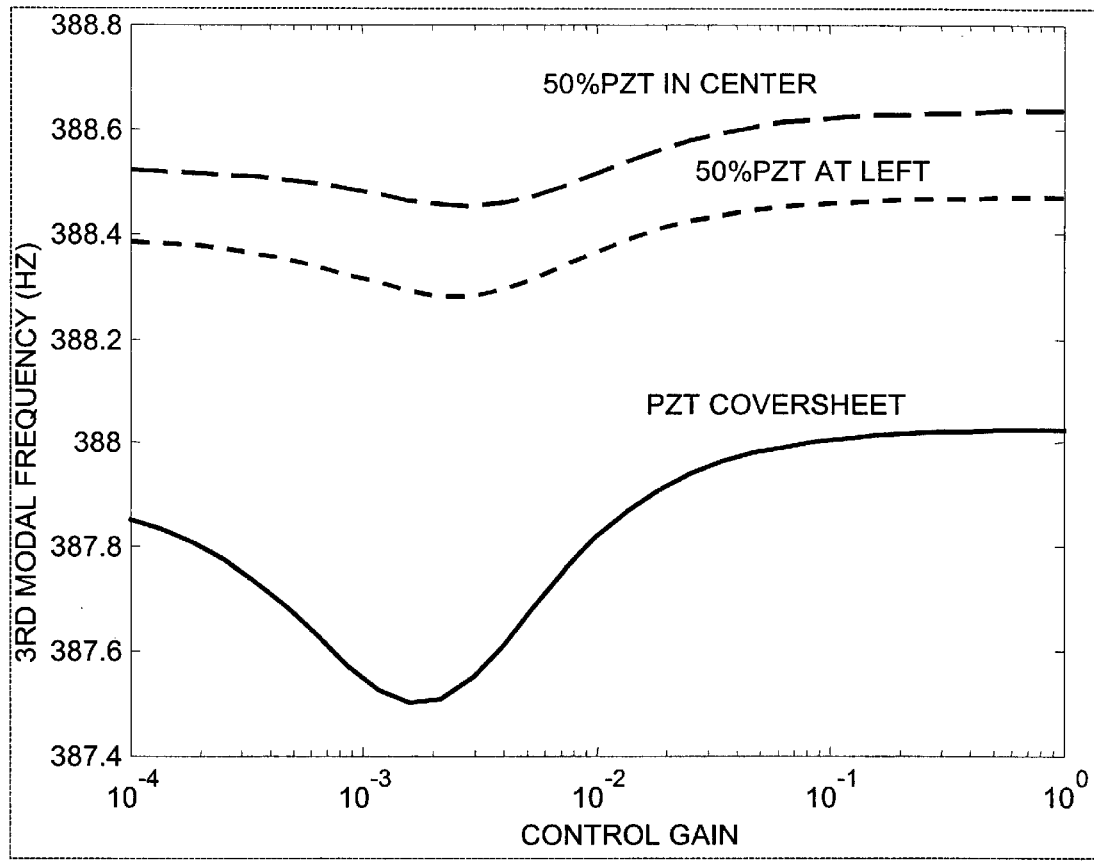
FIG. 23B is a graph showing third modal frequency versus control gain.

Different constraining layer configurations of the HCL are compared for their closed-loop damping performance. The effects of the self-sensing control gain on the first three resonant responses and their corresponding frequencies are shown in FIG. 21, FIG. 22 and FIG. 23 for three constraining configurations. The peak responses of the systems are found to saturate at high control gains. Careful inspection shows that an optimal control gain exists for each configuration. The indistinguishable optimal control gain indicates that the direct active damping is very small compared to the enhanced passive damping. This is an expected result since the direct active control authority of the constraining layer is very weak due to the soft VEM layer. Because of this, there is no need to find the optimal control gain for such configurations. Instead, a saturated control gain is used when different configurations are compared.

Figure 24A:
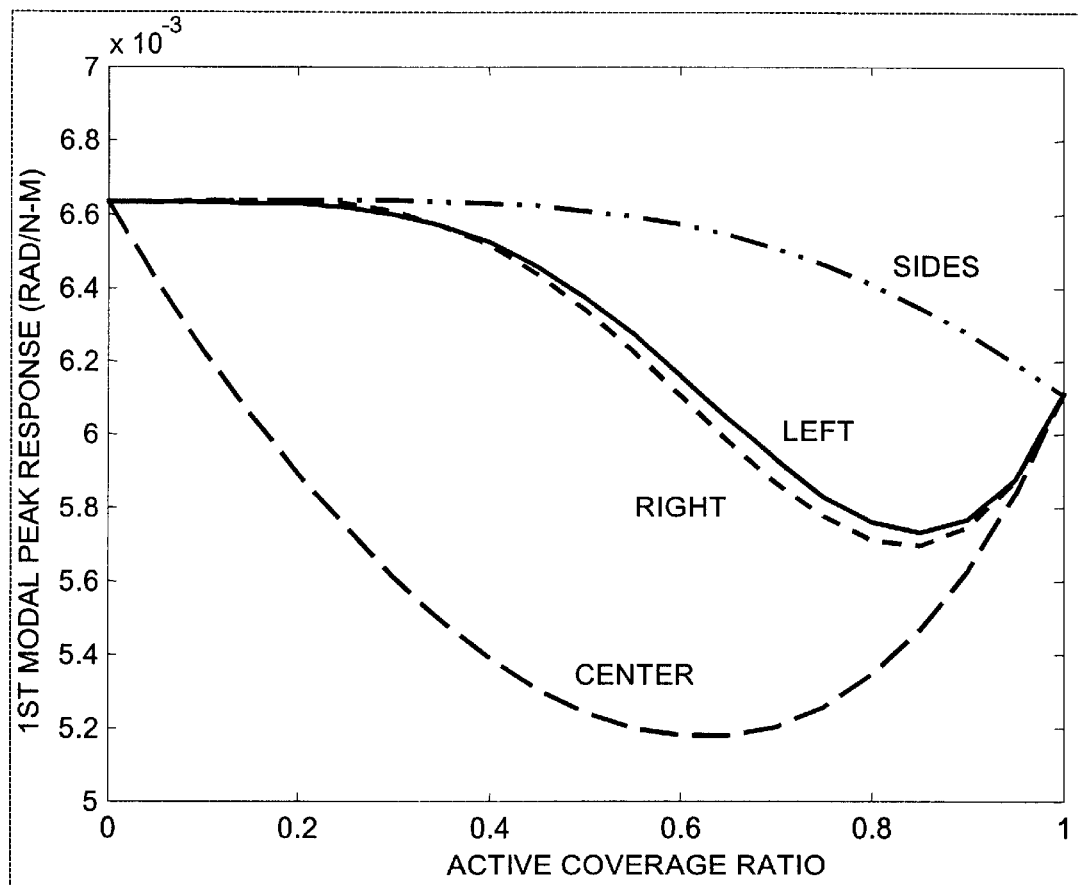
FIG. 24A is a graph showing first modal peak response versus active coverage ratio in the closed loop system.
Figure 24B:
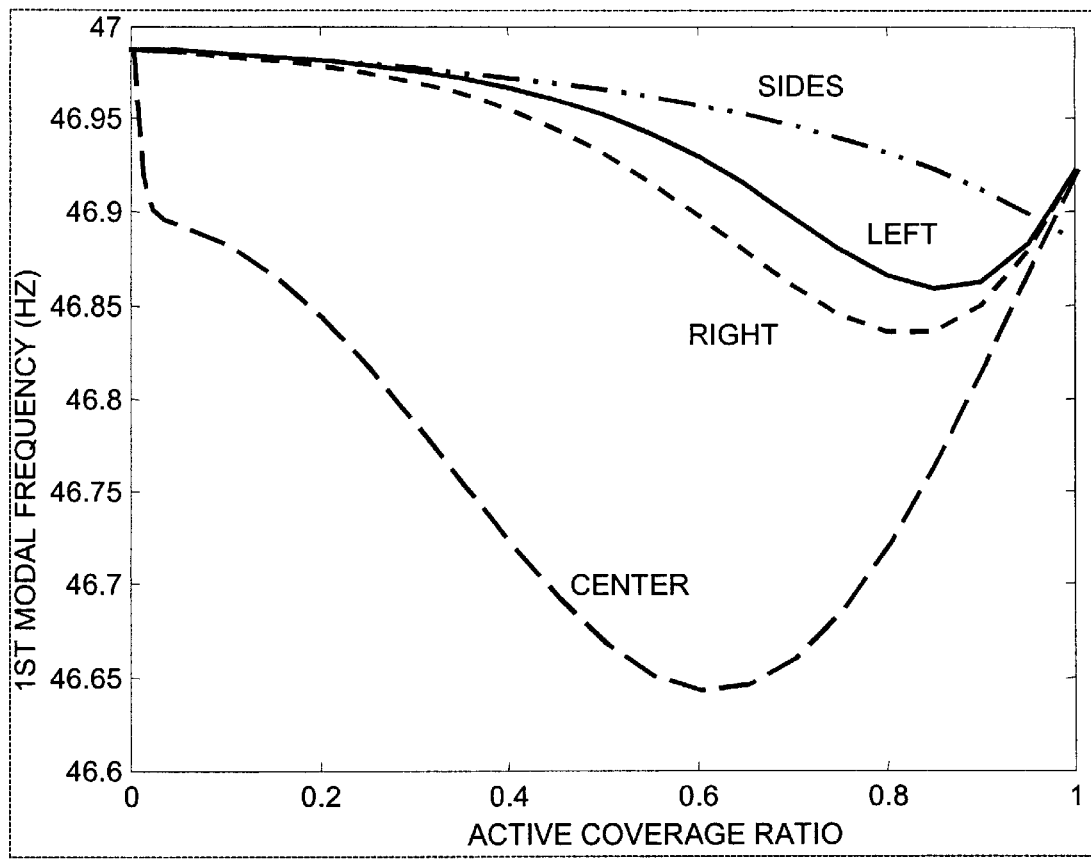
FIG. 24B is a graph showing first modal frequency versus active coverage ratio in the closed loop system.
Figure 25A:
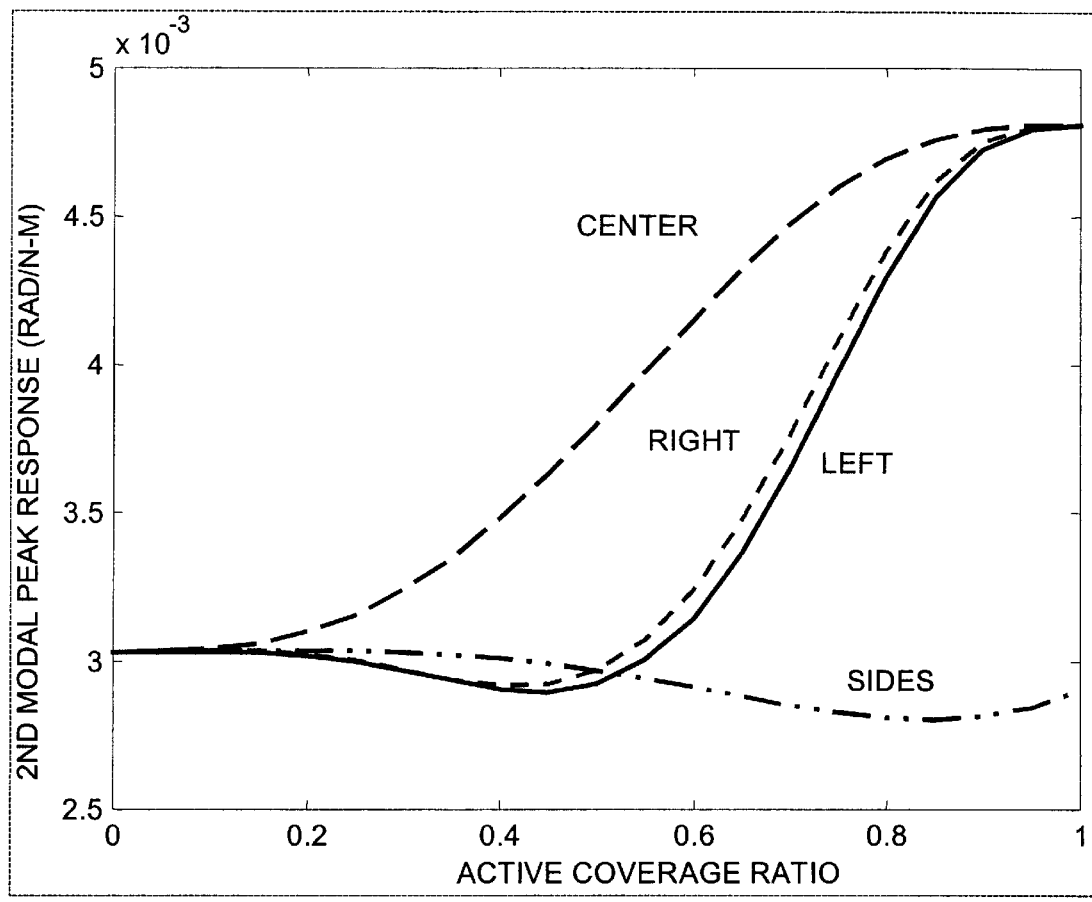
FIG. 25A is a graph showing second modal peak response versus active coverage ratio in the closed loop system.
Figure 25B:
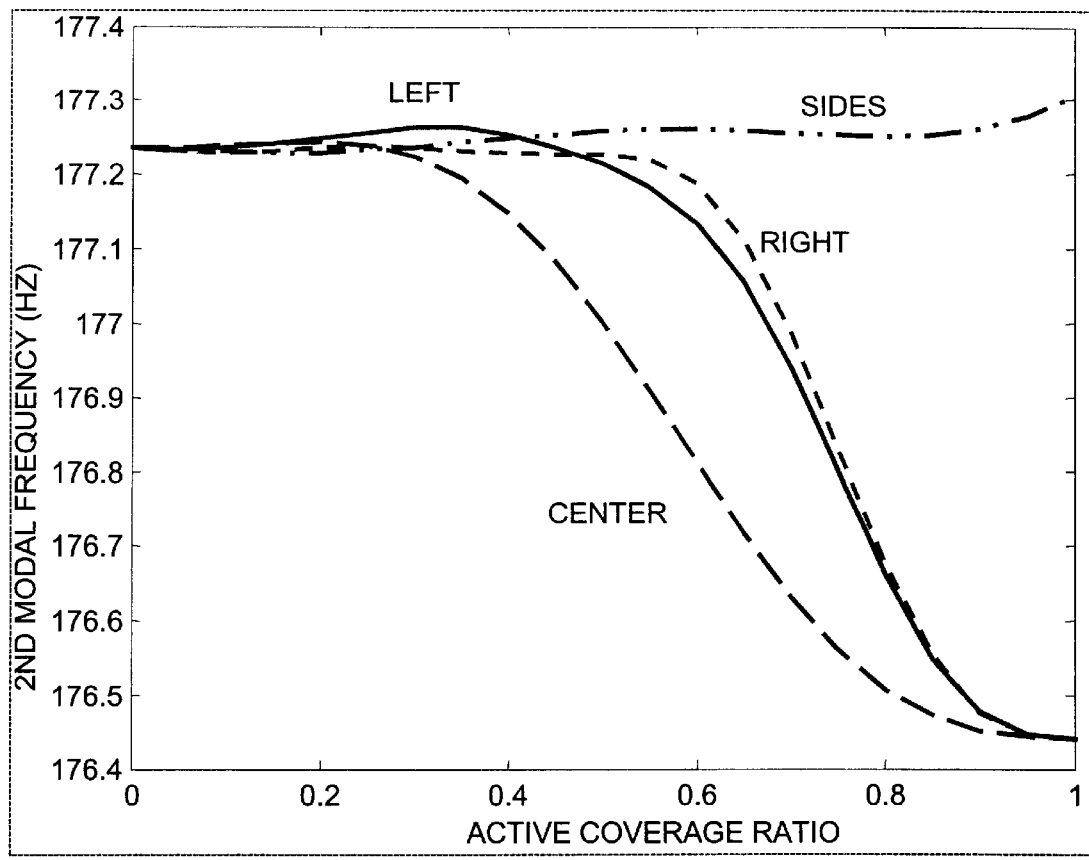
FIG. 25B is a graph showing second modal frequency versus active coverage ratio in the closed loop system.
Figure 26A:
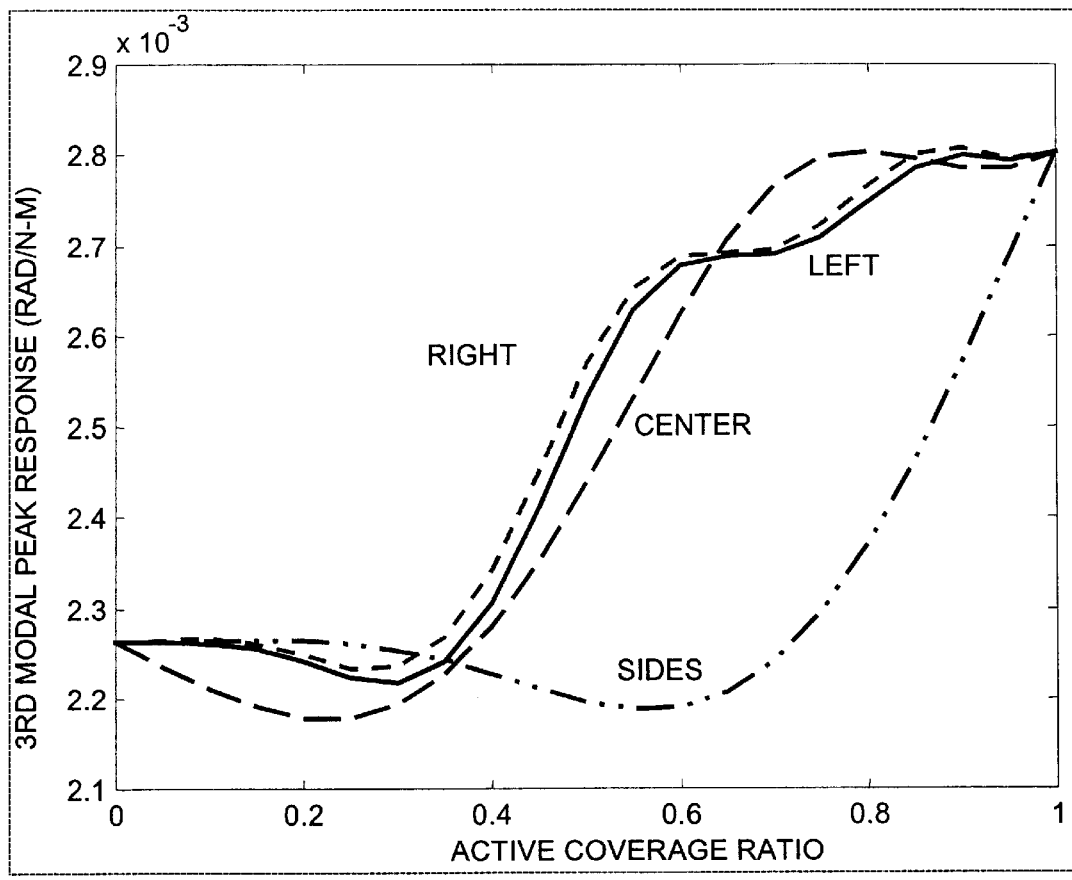
FIG. 26A is a graph showing third modal peak response versus active coverage ratio in the closed loop system.
Figure 26B:
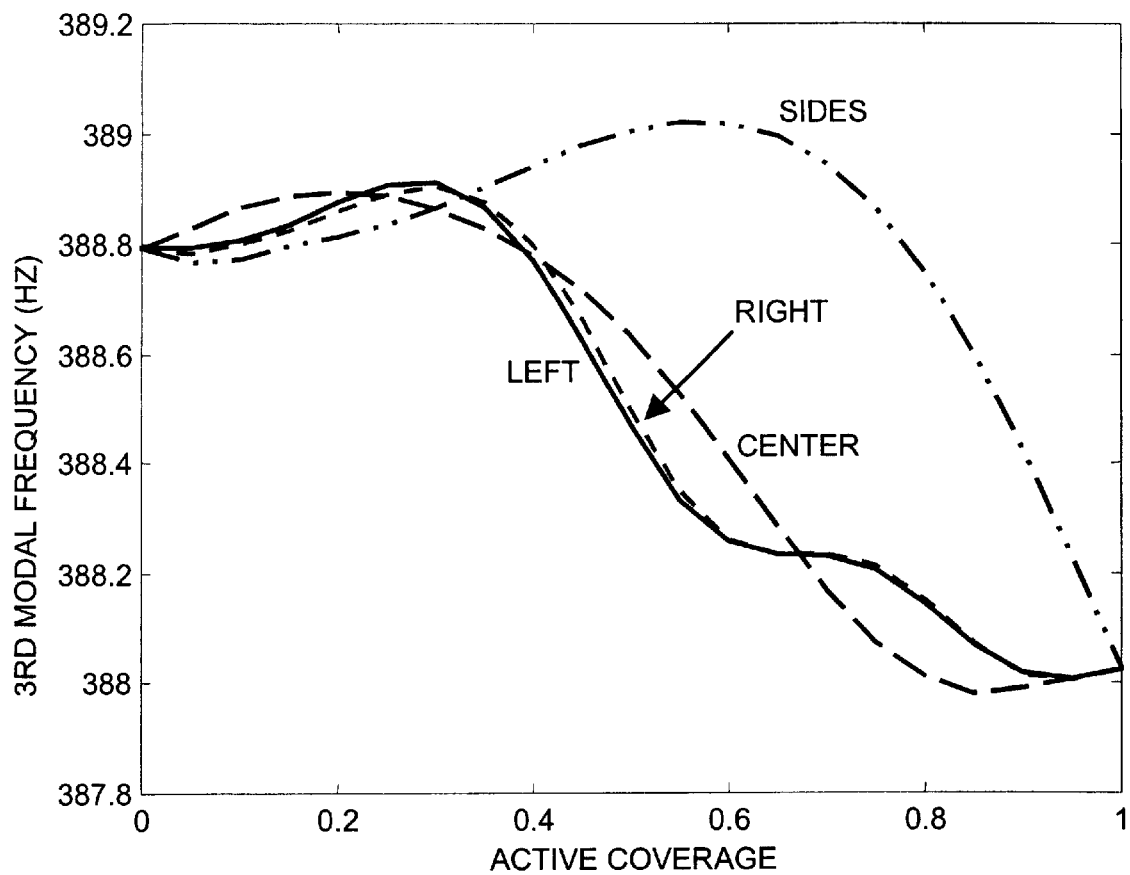
FIG. 26B is a graph showing third modal frequency versus active coverage ratio in the closed loop

With the specification of the control gain, the effects of the active material coverage ratio and the distributions of the active and passive materials in the constraining layer on the resonant responses of the closed-loop system are shown in FIG. 24, FIG. 25 and FIG. 26 for the first, second and third mode, respectively.

For the first mode, placing the active material in the middle section of the constraining layer is the most effective distribution for a given active material coverage ratio. When the active material coverage ratio is optimally designed, this HCL configuration achieves more vibration reduction than the closed-loop ACL treatment. Note, however, that the most effective distribution of the hybrid constraining layer in the closed-loop system is the least effective distribution in the open-loop system. When both the open-loop and closed-loop damping are required for the system, the distribution of the active and passive constraining sections and the active material coverage ratio should both be examined to achieve a good combination of the open-loop and closed-loop damping.

Although placing the active material in the middle section of the constraining layer is the most effective distribution for the first mode, the system becomes uncontrollable for the second mode. As shown in FIG. 25, the closed-loop peak response is the same as the open-loop peak response (FIG. 19). In this case, placing the active material on either side or both sides will make the system controllable. When the active material coverage ratio is less than 0.5, the active material should be placed on one side (the left or right side). Further increase of the active material coverage ratio for these distributions (left or right cases) will reduce the effectiveness of the treatment since some of the action from the active material will cancel each other (the control action will be completely canceled if the whole cover sheet becomes active—actively uncontrollable). Therefore, when the active coverage ratio is greater than 0.5, the active material should be placed on two sides of the constraining layer with a passive material in the middle. Because of the local control law, the control actions from these two sections actually are working out of phase with respect to each other and thus their actions will not cancel out.

For the third mode, the best distribution of the active and passive materials in the constraining section is also related to the active material coverage ratio. For small active material coverage ratio ($\alpha<0.34$), placing the active material in the middle section of the constraining layer is the most effective distribution. For large active material coverage ratio ($\alpha>0.34$), placing the active materials at the two ends of the constraining layer (the "Sides" configuration) is the most effective distribution. Note that the closed-loop ACL response in this case is higher than that of the PCL, while the HCL could still achieve smaller response. This is because for the third mode, the effective ACL treatment length is only ⅓ of the total length as far as its active action is concerned.

A closed form transfer function model of an HCL-treated simply supported beam is derived. The model is used to study the effect of active and passive material distribution in the constraining layer. It is found that, other than the active material coverage ratio, the m distribution of the active and passive constraining sections will also influence the damping effectiveness of the HCL treatment. It is possible to improve the damping performance of the HCL by optimizing the distribution of the active and passive materials in the constraining layer. The effectiveness of a distribution also depends on the mode shape (strain distribution) of the structure.

For the open-loop system, more of the stiffer passive material (smaller active material coverage ratio) in the constraining layer will improve the damping effectiveness of the HCL. For a fixed active material coverage ratio, the most effective distribution of the active and passive materials in the constraining layer is related to the vibration modes of the structure. For the first mode of the composite beam example considered here, placing the passive material in the middle section of the constraining layer is the best distribution. For higher vibration modes, the best distribution will depend on the active material coverage ratio in the constraining layer.

For the closed-loop system, an optimal active material coverage ratio in general exists for controllable systems. For the first mode of the beam discussed here, placing the active material in the middle section of the constraining layer will be the most effective distribution. However, for higher vibration modes, the optimal distributions are functions of the active material coverage ratio.

Since the requirements for the active material coverage ratio and the distribution of the active and passive constraining sections to obtain the highest open-loop and closed-loop damping are generally conflicting, a compromise has to be made between the open-loop and closed-loop performance. The HCL can be used to provide better combination of the open-loop and closed-loop damping than the ACL by adjusting the active material coverage ratio and the distribution of the active and passive materials.

A new method and apparatus for an improved surface damping treatment has been disclosed. The invention is an active-passive hybrid constrained layer. The invention improves over the performance of treatment with a pure active coversheet by mixing passive and active materials in the constraining layer. Non-dimensional equations of motion of a generic treatment model are developed and closed form solutions are derived. Using the damping loss factors as indices, parametric studies are performed to show the effects of the stiffness and dimension of the passive constraining material on the system damping characteristics. It is shown that by selecting a stiffer passive constraining material (stiffer than the active part) and an optimal active-to-passive dimension ratio, this new configuration achieves better closed-loop performance and fail-safe ability than the treatments with a pure active PZT constraining layer. Further, it is also illustrated that the inclusion of a passive material in the constraining layer can provide more flexibility for the design to satisfy different requirements, such as weight penalty versus damping authority. It has also been shown that HCL can be used to provide better combination of the open-loop and closed-loop damping than the ACL by adjusting the active material coverage ratio and the distribution of the active and passive materials. Further, it has been shown that the selective distribution of the active and passive constraining sections improves the damping effectiveness of the HCL treatment.

One skilled in the art will recognize that the present invention contemplates numerous variations. These variations include the use of different materials in both the active and passive layers, a different physical configuration of the interface between the active and passive layers, including an insulator between the active and passive layers, different numbers and shapes of the active and passive layers or portions thereof, and numerous other variations such may be apparent or appropriate when used in a particular environment or application.

What is claimed is:

1. A structure for surface damping augmentation comprising:
    a viscoelastic material;
    a hybrid constraining layer mechanically connected to the viscoelastic material and having an active material and a passive material; and
    the active material mechanically connected to the passive material.

2. The structure of claim 1 wherein both the active material and the passive material are mechanically connected to the viscoelastic material.

3. The structure of claim 1 wherein the active material and the passive material are electrically insulated.

4. The structure of claim 1 wherein the active material has a first set of dimensions and the passive material has a second set of dimensions, the first set of dimensions and the second set of dimensions selected to produce optimized surface damping.

5. The structure of claim 1 wherein the active material is a piezoelectric material.

6. The structure of claim 1 wherein the active material is a PZT ceramic material.

7. The structure of claim 1 wherein the active material is a PVDF polymer.

8. The structure of claim 1 further comprising at least one anchor for connecting the hybrid constraining layer to a host structure.

9. The structure of claim 1 wherein the coverage ratio of an active constraining layer of the active material is within the range 0 to 1.

10. The structure of claim 1 wherein the passive material is stiffer than the active material.

11. The structure of claim 1 wherein the passive material is a plurality of sections of passive constraining material.

12. The structure of claim 1 wherein the active material is a plurality of sections of active constraining material.

13. A method of designing a constrained layer for structural damping augmentation comprising:
    selecting an active constraining material;
    selecting a passive constraining material;
    forming a hybrid constraining layer from the active constraining material and the passive constraining material; and
    mechanically connecting the hybrid constraining layer to a viscoelastic material.

14. The method of claim 13 further comprising selecting a first dimension for the active constraining material and a second dimension for the passive constraining material to all optimize damping effect.

15. The method of claim 13 further comprising selecting a coverage ratio of the active constraining material to the passive constraining material.

16. The method of claim 13 further comprising arranging the active constraining material into one or more sections.

17. The method of claim 13 further comprising arranging the passive constraining material into one or more sections.

* * * * *